US009897062B2

(12) United States Patent
Nakayama et al.

(10) Patent No.: US 9,897,062 B2
(45) Date of Patent: Feb. 20, 2018

(54) IGNITION DEVICE

(71) Applicant: DENSO CORPORATION, Kariya, Aichi-pref. (JP)

(72) Inventors: Satoru Nakayama, Kariya (JP); Makoto Toriyama, Kariya (JP); Akimitsu Sugiura, Kariya (JP); Masahiro Ishitani, Kariya (JP); Atsuya Mizutani, Kariya (JP); Kouji Andoh, Kariya (JP); Naoto Hayashi, Kariya (JP); Kaori Doi, Kariya (JP)

(73) Assignee: DENSO CORPORATION, Kariya (JP)

( * ) Notice: Subject to any disclaimer, the term of this patent is extended or adjusted under 35 U.S.C. 154(b) by 91 days.

(21) Appl. No.: 15/039,857

(22) PCT Filed: Nov. 28, 2014

(86) PCT No.: PCT/JP2014/081641
§ 371 (c)(1),
(2) Date: May 27, 2016

(87) PCT Pub. No.: WO2015/080270
PCT Pub. Date: Jun. 4, 2015

(65) Prior Publication Data
US 2017/0045025 A1    Feb. 16, 2017

(30) Foreign Application Priority Data

Nov. 28, 2013  (JP) .................................. 2013-246091
Apr. 3, 2014   (JP) .................................. 2014-076705
Sep. 18, 2014  (JP) .................................. 2014-189661

(51) Int. Cl.
*F02P 15/10*   (2006.01)
*F02P 17/12*   (2006.01)
(Continued)

(52) U.S. Cl.
CPC ............. *F02P 15/10* (2013.01); *F02P 3/0407* (2013.01); *F02P 3/05* (2013.01); *F02P 3/051* (2013.01);
(Continued)

(58) Field of Classification Search
CPC .. F02P 15/10; F02P 3/05; F02P 3/0407; F02P 5/145; F02P 5/15; F02P 17/12; F02P 3/051; F02P 9/002; F02P 9/007; Y02T 10/46
See application file for complete search history.

(56) References Cited

U.S. PATENT DOCUMENTS 8,973,562 B2 *  3/2015  Tanaya .................... F02P 3/053
                                                      123/620
2007/0181110 A1  8/2007  Toriyama et al.
(Continued)

FOREIGN PATENT DOCUMENTS

JP    02-020466    6/1990
JP    05-018343    1/1993
(Continued)

*Primary Examiner* — Jared Fureman
*Assistant Examiner* — Win Htun
(74) *Attorney, Agent, or Firm* — Nixon & Vanderhye PC

(57) ABSTRACT

An ignition device at least equipped with a DC power source, an ignition coil unit, a spark plug, an ignition switch, and an auxiliary power source, wherein the auxiliary power source is at least equipped with a discharge energy accumulating means, a discharge switch, and a discharge driver. The ignition device is further equipped with a secondary-current feedback controlling means comprising a secondary current detecting means for detecting a secondary current flowing during the ignition coil unit discharge period, and a secondary current feedback control circuit-for determining an upper limit and a lower limit for the secondary current from binary threshold values, and driving so as to open and close the discharge switch on the basis of the determination (Continued)

results. Furthermore, energy is introduced from the auxiliary power source without switching the polarity of the secondary current.

11 Claims, 21 Drawing Sheets

(51) Int. Cl.
   *F02P 5/145*  (2006.01)
   *F02P 3/05*   (2006.01)
   *F02P 3/04*   (2006.01)
   *F02P 5/15*   (2006.01)
   *F02P 9/00*   (2006.01)

(52) U.S. Cl.
   CPC .............. *F02P 5/145* (2013.01); *F02P 5/15* (2013.01); *F02P 17/12* (2013.01); *F02P 9/002* (2013.01); *F02P 9/007* (2013.01); *Y02T 10/46* (2013.01)

(56) References Cited

U.S. PATENT DOCUMENTS

| | | | |
|---|---|---|---|
| 2008/0127937 A1* | 6/2008 | Toriyama | F02P 3/053 123/406.12 |
| 2012/0293088 A1* | 11/2012 | Tanaya | F02P 3/0892 315/224 |
| 2014/0090628 A1* | 4/2014 | Aida | F02P 15/00 123/620 |

FOREIGN PATENT DOCUMENTS

| | | |
|---|---|---|
| JP | 2000-018141 | 1/2000 |
| JP | 2008-088948 | 4/2008 |
| JP | 2009-052435 | 3/2009 |
| JP | 2014-218995 | 11/2014 |
| JP | 2014-218997 | 11/2014 |
| JP | 2015-063931 | 4/2015 |
| JP | 2015-200269 | 11/2015 |
| JP | 2015-200281 | 11/2015 |
| WO | WO 2014-060157 | 4/2014 |

* cited by examiner (EXAMPLE 1)

(COMPARATIVE EXAMPLE 1)

FIG.5
(EXAMPLE 1)
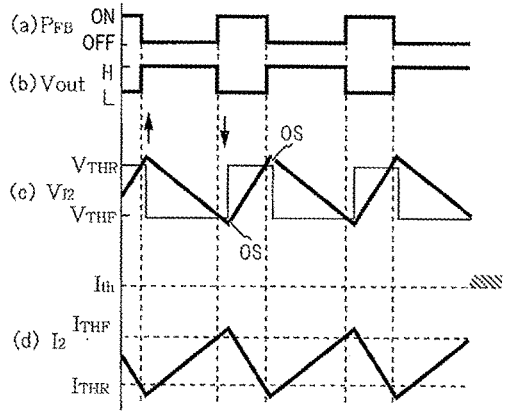
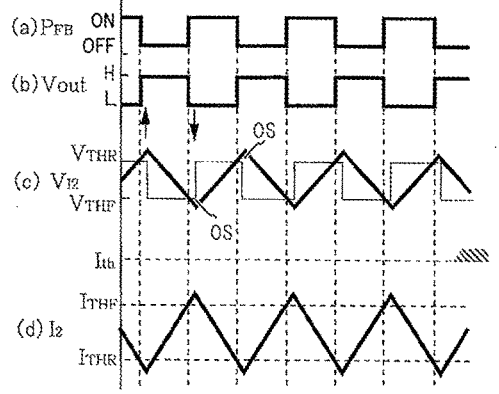
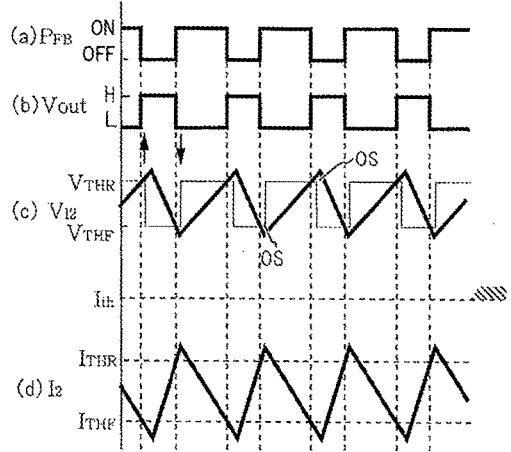
(COMPARATIVE EXAMPLE 1)
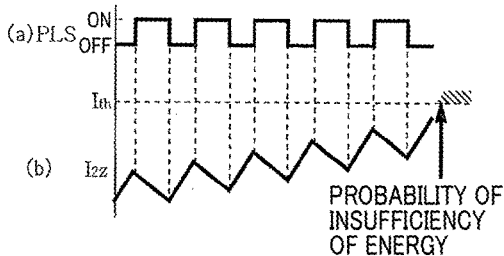
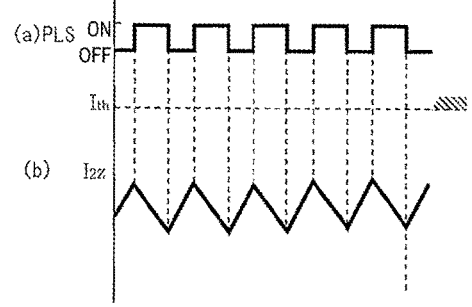
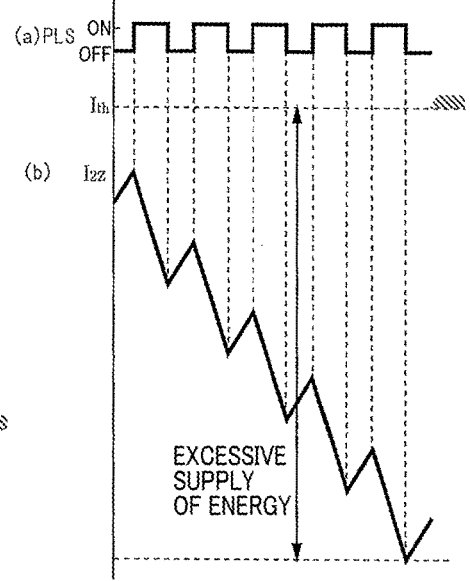

(AUXILIARY DISCHARGE IS PERFORMED, NORMAL STATE)

(AUXILIARY DISCHARGE IS PERFORMED, STATE WHERE AUXILIARY POWER SOURCE HAS MALFUNCTION)

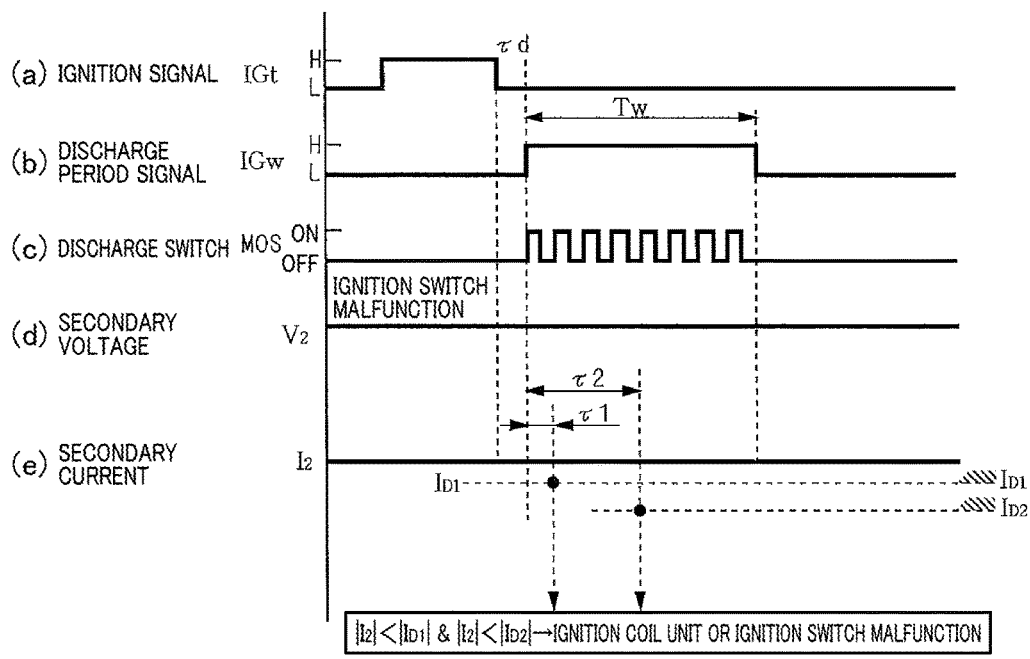
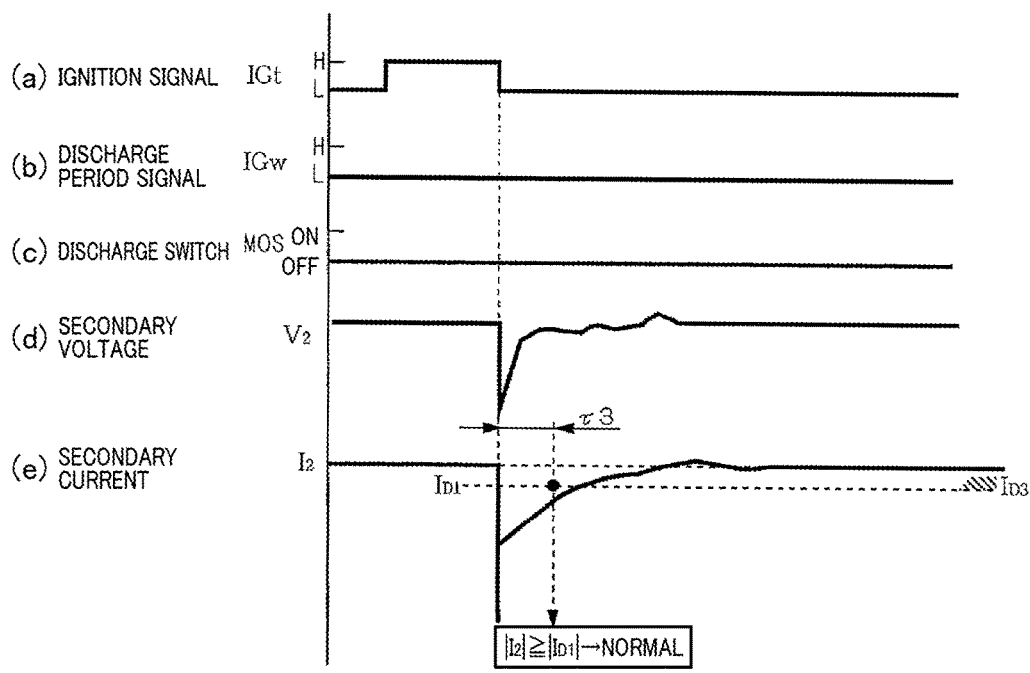

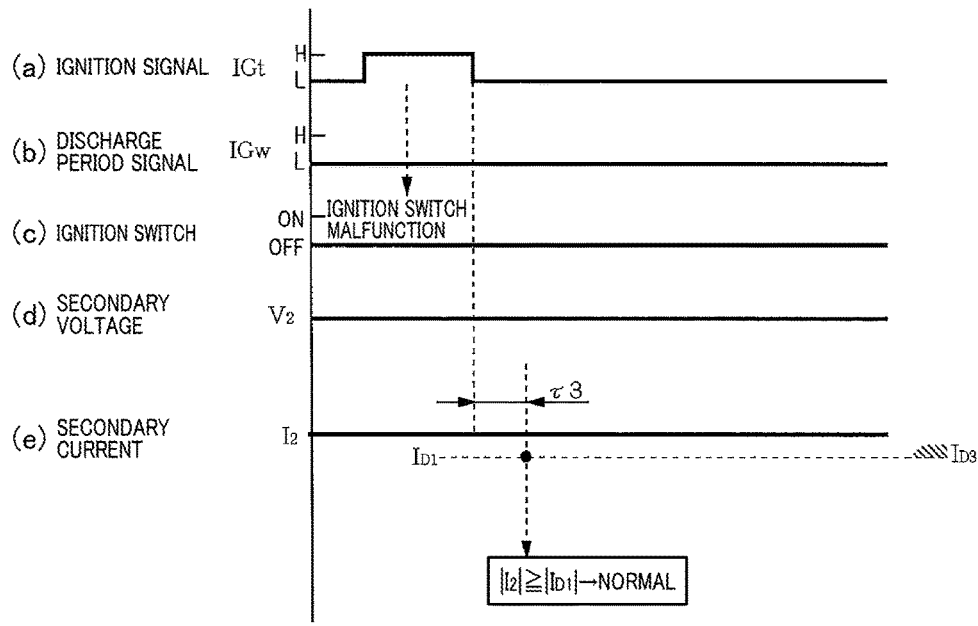
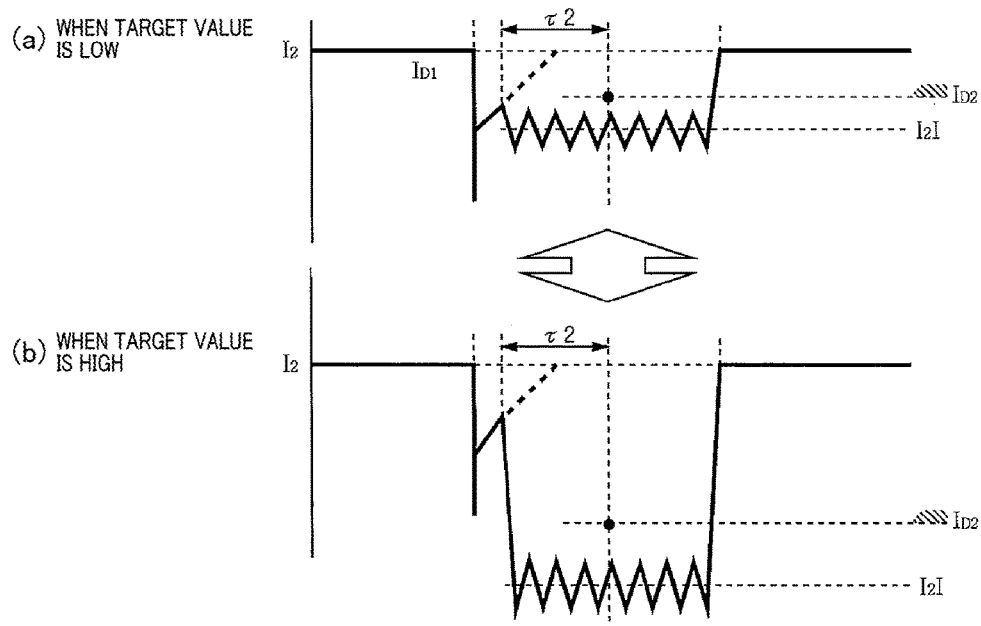

IGNITION DEVICE

This application is the U.S. national phase of International Application No. PCT/JP2014/081641 filed Nov. 28, 2014 which designated the U.S. and claims the benefit of priority from earlier Japanese Patent Application No. 2013-246091 filed Nov. 28, 2013, No. 2014-076705 filed Apr. 3, 2014 and No. 2014-189661 filed Sep. 18, 2014, the entire contents of each of which are hereby incorporated by reference.

TECHNICAL FIELD

The present invention relates to an ignition device igniting an internal combustion engine, and especially relates to the ignition device including an auxiliary power source ensuring continuous discharge.

BACKGROUND ART

PTL1 shows, aside from a usual ignition device, an ignition coil including a DC-DC converter which inputs discharge energy to the ignition coil on the secondary side.

The ignition device of PTL1 extends the discharge continuation period after starting discharge by supplying power to an ignition plug through the secondary coil of the ignition coil, and thereby attempts to ensure stable ignition.

However, regarding the conventional ignition device shown in PTL1, because an electric current is directly supplied to the secondary coil of the ignition coil where the extremely high voltage is generated, the DC-DC converter needs to be formed by high-voltage elements. This results in an increase in manufacturing cost, an increase in size of the device, and a decrease in reliability.

In PTL2, a spark plug includes a full-bridge circuit. The full-bridge circuit includes an ignition coil (Tr), a first serially connected circuit having a first switching means (T1) and a second switching means (T2), and a second serially connected circuit having a third switching means (T3) and a fourth switching means (T4). A center tap (1) of the first serially connected circuit is connected to a power source potential, a center tap (2) of the second serially connected circuit is connected to a reference potential, and the first and second center taps are each connected to a primary side of the ignition coil. Further, a capacitor (Cz) and a fifth switching means (T5) connected to the second center tap and a diode (D1) are provided. The ignition device having the following characteristics is shown. That is, a controller device (SE) controls the switching means to cause breakdown, and subsequently to generate an alternating current having a constant amplitude.

CITATION LIST

Patent Literature

[PTL 1] Japanese Examined Utility Model Application Publication No. H02-20466
[PTL 2] International Publication No. WO 2014/060157

SUMMARY

In the ignition device of PTL2, because the secondary current is maintained by supplying the alternating current, the polarity of the secondary current necessarily alternates, and there are moments at which the secondary current is 0. If the secondary current is below a blow-off limiting threshold, the spark discharge might be blown off, and ignition stability might be reduced.

The inventers of the present invention has found, by study, that even if an auxiliary power source is provided on the primary side, when the input amount of the discharge energy from the auxiliary power source is insufficient, the secondary current becomes lower than the blow-off limiting threshold, the spark discharge might be blown off, and ignition stability might be reduced. Further, excessive input of the discharge energy might result in electrode wear of the ignition plug.

Accordingly, in light of the background, the present invention has an object to provide an ignition device of an internal combustion engine whose ignition robustness is improved by superimposing discharge currents keeping the same polarity with easy configurations to prevent the blow-off of the discharge, to prevent electrode wear due to re-discharge, and to ensure maintenance of stable discharge.

An ignition device in an embodiment of this disclosure includes: at least a direct-current power source; an ignition coil unit electrically is connected to the direct-current power source and includes a primary coil and secondary coil, an ignition plug connected to the secondary coil and generating electric sparks due to spark discharge in an internal combustion engine, the spark discharge being caused by an applied secondary voltage from the secondary coil; an auxiliary power source superimposes electric energy on a downstream side of the primary coil after starting the spark discharge in the ignition plug; a first switch switches between supply and stopping supply of energy from the auxiliary power source; and a secondary current feedback controlling means includes a secondary current detecting means and a secondary current feedback controlling circuit, the secondary current detecting means detecting the secondary current flowing through the secondary coil during the discharge period of the ignition coil unit, the secondary current feedback controlling circuit driving the first switch to switch on the basis of the secondary current detected by the secondary current detecting means; wherein the ignition device allows the auxiliary power source to input energy without reversing the polarity of the secondary current.

According to this disclosure, the secondary current flowing through the secondary coil of the ignition coil is detected, and fed back to control supply and stop of supply of the discharge energy from the auxiliary power source. Thus, with extremely easy configurations, and without being affected by an increase in the second voltage, a difference between devices, aged deterioration, change in discharge environment and the like, the discharge energy can be supplied to the ignition plug, and the secondary current can be kept within a constant range without interruption. Accordingly, a highly reliable ignition device which can maintain the discharge from the auxiliary power source, the discharge being performed after the spark discharge, over an arbitrary period, and thus can realize stabilized ignition.

BRIEF DESCRIPTION OF THE DRAWINGS

In the accompanying drawings.

FIG. 5 is a set of timing diagrams, one showing the effect of the present invention given to change in operating condition, one showing the Comparative Example;

FIG. 16C is a timing diagram showing the effect of the malfunction determining means provided to the ignition device 7e of FIG. 14, and showing a case where malfunction of an ignition coil unit or an ignition switch is determined when the auxiliary power source 5d discharges;

FIG. 16D is a timing diagram showing the effect of the malfunction determining means provided to the ignition device 7e of FIG. 14, and showing a case where the ignition coil unit or the ignition switch is normal when the auxiliary power source 5d does not discharge;

FIG. 16E is a timing diagram showing the effect of the malfunction determining means provided to the ignition device 7e of FIG. 14, and showing a case where the ignition coil unit or the ignition switch has malfunction when the auxiliary power source 5d does not discharge;

FIG. 17 is a characteristic diagram showing difference in malfunction criterion depending on difference in secondary current target value;

DETAILED DESCRIPTION OF PREFERRED EMBODIMENTS

<First Embodiment>

Figure 1:
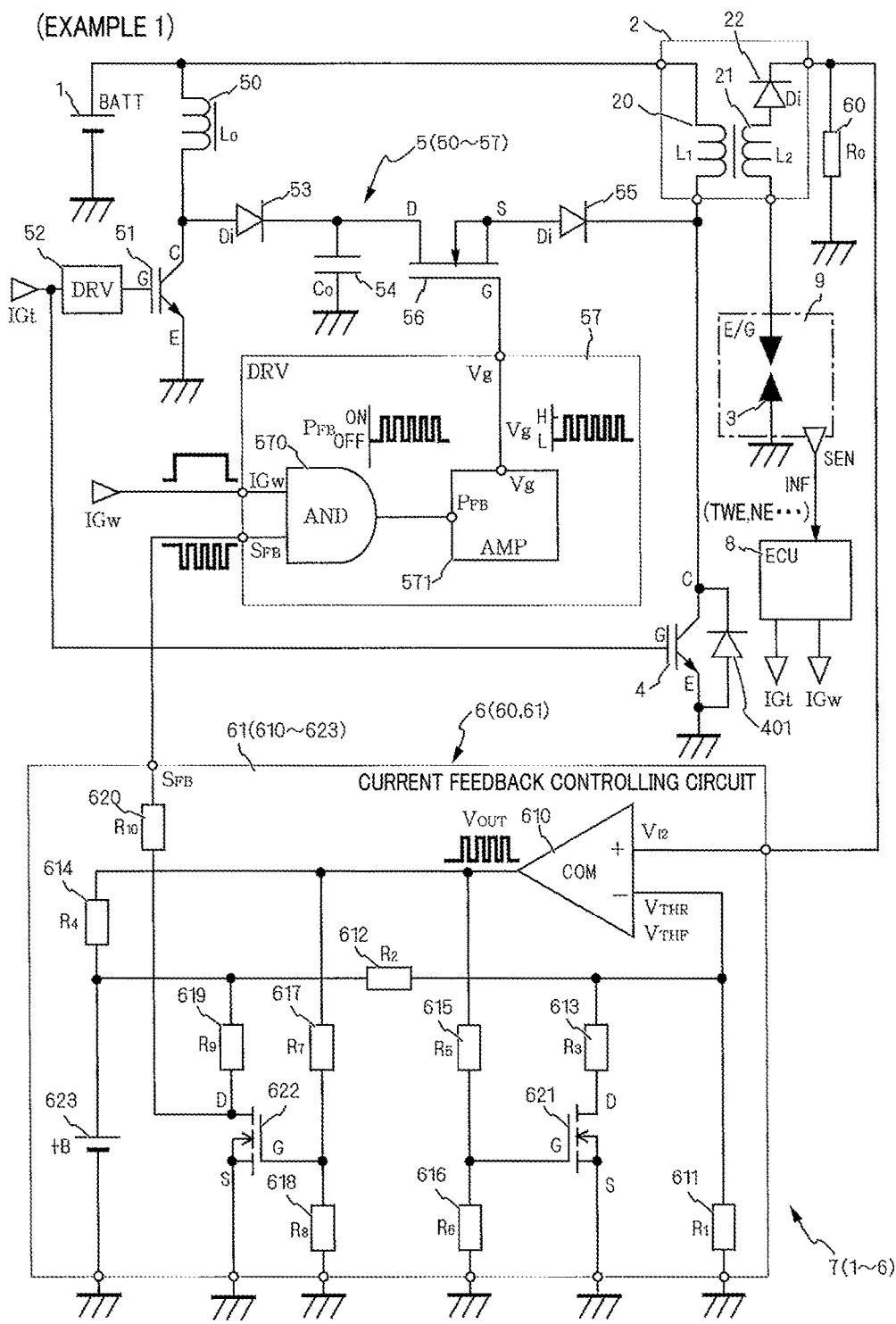
FIG. 1 is a schematic configuration diagram of an ignition device 7 in a first embodiment of the present invention.

With reference to FIG. 1, hereinafter is described an ignition device 7 in a first embodiment of the present invention. It should be noted that, in this application document, positive and negative signs indicate directions of electric current, and magnitude of electric current is indicated on the basis of the magnitude of an absolute value of electric current. Increase or rise of electric current refers to increase in absolute value of electric current, and decrease or lowering of electric current refers to decrease in absolute value of electric current.

The ignition device 7 of the present invention is provided to each cylinder of an internal combustion engine 9 and ignites an air-fuel mixture introduced into a combustion chamber, not shown, by generating spark discharge.

The ignition device 7 includes a direct-current power source 1, an ignition coil unit 2, an ignition plug 3, an ignition switch 4, an auxiliary power source 5, and a secondary current feedback controlling means 6 which is a main portion of the present embodiment.

The ignition device 7 in the present embodiment is characterized in that the device includes, as the secondary current feedback controlling means 6, a secondary current detecting means 60 and a secondary current feedback controlling circuit 61. The secondary current detecting means 60 detects a secondary current $I_2$ flowing through a secondary coil 21 of the ignition coil unit 2. The secondary current feedback controlling circuit 61 judges the detected secondary current $I_2$ on the basis of a threshold to control supply and stop of discharge energy from the auxiliary power source 5. Thus, the secondary current feedback controlling circuit 61 keeps the secondary current $I_2$ within a predetermined range without reversing the polarity of the secondary current $I_2$. That is, the secondary current feedback controlling circuit 61 maintains the secondary current $I_2$ at the same polarity, and preferably keeps the absolute value of the secondary current $I_2$ at a blow-off limit current Ith or more. The blow-off limit current Ith is described later.

According to the ignition device 7, input of discharge energy from the auxiliary power source 5 is controlled by the secondary current feedback controlling means 6 in a suitable proportion, regardless of operating condition of an internal combustion engine. Thus, stable discharge can be always maintained, and mixture air introduced to a combustion chamber can be ignited.

According to the present invention, the secondary current $I_2$ is maintained in a given range without reversing the polarity. Thus, energy can be continuously input to the mixture air, and blow-off due to falling down of the secondary current I2 close to zero cross point or due to changeover of the polarity of the secondary current $I_2$ can be prevented.

As the direct-current power source 1, a battery, a stabilized DC power supply supplying an output stabilized such as by a switching regulator from an alternating-current power source, or the like is used. For example, the direct-current power source 1 supplies a constant DC voltage +B such as of 14 V or 24 V.

Also, the battery voltage can be boosted such as by a DC-DC converter for use as the direct-current power source 1.

The ignition coil unit 2 includes a primary coil 20, the secondary coil 21, and a rectifier device 22 to configure a publicly-known boosting transformer.

The ignition coil unit 2 generates a high voltage in the secondary coil 21 when the electric current of the primary coil 20 is changed with the interruption of the electric current from the direct-current power source 1.

The primary coil 20 is formed by winding a primary winding, which is coated with a publicly-known insulating coating, around a primary bobbin so as to have a predetermined number $N_1$ of turns (self-inductance: $L_1 \sim N_1^2$). Although not shown, the primary bobbin is provided so as to surround a center core.

The secondary coil 21 is formed by winding a secondary winding, which is coated with a publicly-known insulating coating, around a secondary bobbin so as to have a predetermined number $N_2$ of turns (self-inductance: $L_2 \sim N_2^2$). Although not shown, the secondary bobbin is provided so as to cover the outer periphery of the primary coil 20.

When the electric current from the direct-current power source 1 to the primary coil 20 is interrupted by switching of the ignition switch 4, the ignition coil unit 2 produces a secondary voltage $V_2$, which is higher than a primary voltage $V_1$ by a factor of a turn ratio ($N=N_2/N_1$), in the secondary coil 21 to apply the high secondary voltage $V_2$ to the ignition plug 3.

A diode is used as the rectifier device 22, and the rectifier device 22 rectifies the direction of the electric current which flows through the secondary coil 21.

The upstream side of the primary coil 20 is connected to the direct-current power source 1, and the downstream side is grounded through the ignition switch 4.

Further, the auxiliary power source 5 is connected to the downstream side of the primary coil 20.

One of the ends of the secondary coil 21 is connected to the rectifier device 22 and grounded through a current detector resistor provided as the secondary current detecting means 60 ($R_0$: for example, approximately 10Ω), while being connected to the secondary current feedback controlling circuit 61.

The other end of the secondary coil 21 is connected, through a high voltage tower or the like, not shown, to a center electrode of the ignition plug 3 provided to the internal combustion engine 9.

Any stick type ignition coil and any plug-top type ignition coil can be applied to the present invention. The stick type ignition coil can be housed in a plug hole. The plug-top type ignition coil can be housed in a housing fixed to a top of a plug hole.

A publicly-known ignition plug including a center electrode and a ground electrode, which are opposed to each other through an insulator, not shown, can be used appropriately as the ignition plug 3.

The ignition plug 3, with the application of the high secondary voltage $V_2$ from the ignition coil 2, produces an electric spark due to spark discharge in the combustion chamber.

A publicly known power transistor such as an IGBT or a thyristor is used as the ignition switch 4.

The upstream side terminal (collector: C) of the ignition switch 4 is connected to the downstream side of the primary coil 20 of the ignition coil unit 2. The downstream side terminal (emitter: E) of the ignition switch 4 is grounded. An ignition signal IGt is sent from an engine controller unit (ECU) 8 according to operating condition of the international combustion engine 9, and inputted to the drive terminal (gate: G) of the ignition switch 4. The ignition switch 4 is turned ON in synchronization with a rising edge of the ignition signal IGt, and turned OFF in synchronization with a falling edge of the ignition signal IGt. The ECU 8 detects the operating condition on the basis of operation information of the internal combustion engine 9, such as an engine coolant water temperature TWE, a crank angle CA, an accelerator position THL and an engine speed NE, to output the ignition signal IGt and a discharge period signal IGw described later. The operation information is detected by an operating condition detecting means SEN including various sensors and the like.

In the ignition switch 4, a flywheel diode 401 is inserted so as to bypass between the collector C and the emitter E.

The flywheel diode 401 is a rectifier device which is intervened between the collector C and the emitter E of the ignition switch 4, allows the electric current to flow from the emitter side (ground side) to the collector side (power source side), and interrupts the reverse electric current.

While the ignition switch 4 is turned OFF, a bypass is formed by the flywheel diode 401, which allows the electric current to flow from the emitter side to the collector side.

After the discharge is started by switching the ignition switch 4, the discharge energy is introduced from the auxiliary power source 5 to the primary coil 20 of the ignition coil unit 2 through the downstream side of the primary coil 20 as described later, and thereafter a discharge switch 56 is turned off. In this case, the flywheel current of the ignition coil unit 2 is allowed to flow through a path starting from the ignition coil unit 2, passing through the battery 1, GND and the flywheel diode 401 in this order, and returns to the ignition coil unit 2. Thus, the continuity of the electric current flowing through the ignition coil unit 2 can be maintained.

Accordingly, introducing the discharge energy can be continued without reversing the polarity of the secondary current $I_2$.

Also, an energy input period from the auxiliary power source 5 can be set as desired.

The auxiliary power source 5 in the present embodiment includes a choke coil 50, a charge switch 51, a charge driver 52, rectifier devices 53 and 55, a charge capacitor 54, the discharge switch 56, and a discharge driver 57.

A coil with a core having a predetermined self-inductance ($L_0$: for example, 5 to 50 µH) is used as the choke coil 50.

The upstream side of the choke coil 50 is connected to the direct-current power source 1, and the downstream side is grounded through the charge switch 51.

A publicly-known power transistor, such as an IGBT or a MOSFET, is used as the charge switch 51.

The charge switch 51 is on/off controlled by the charge driver 52.

A capacitor (capacitance: C0, for example, 50 to 500 µF) as a discharge energy accumulating means 54 is connected between the choke coil 50 and the charge switch 51 through the rectifier device 53.

The capacitor 54 is connected to the discharge switch 56 through the rectifier device 55, and further connected to the downstream side of the primary coil 20 of the ignition coil unit 2.

Diodes are used as the rectifier devices 53 and 55.

The rectifier device 53 blocks the reverse electric current from the capacitor 54 to the choke coil 50 and to the charge switch 51 side.

The rectifier device 55 blocks the reverse electric current from the ignition coil unit 2 to the capacitor 54.

The charge driver 52 includes a charge pump and the like, and generates drive pulses cyclically turning on/off the charge switch 51 with a drive voltage necessary for on/off driving the charge switch 51.

The choke coil 50, the charge switch 51, the charge driver 52, the rectifier device 53, and the discharge energy accumulating means 54 configure a chopper type DC-DC boosting converter.

The charge switch 51 is opened and closed, while the discharge period signal IGw is OFF. The discharge period signal IGw indicates an auxiliary power supply period (discharge period of the capacitor 54 or discharge energy input period Tw in present embodiment) for supplying the discharge energy from the auxiliary power source. The capacitor 54 is charged by switching of the charge switch 51 with the energy accumulated in the choke coil 50 by the direct-current power source 1 so as to be boosted to the comparatively high discharge voltage $V_{DC}$ (for example, 100 V to hundreds V). It should be noted that the cycle of the drive pulse generated by the charge driver 52 is not especially limited, as long as the charge switch 51 can be turned on/off such that the capacitor 54 is charged with enough energy at the start of the discharge.

A publicly-known driver which is generally used for driving semiconductor devices can be used as the charge driver 52.

A power transistor such as nMOSFET or FET is used in the discharge switch 56. If the discharge switch 56 is closed during the discharge period, the electric energy accumulated in the capacitor 54 is discharged toward the downstream side of the primary coil 20 of the ignition coil unit 2.

The discharge driver 57 which turns on/off the discharge switch 56 includes an AND circuit 570. The AND circuit 570 carries out the logical AND between the discharge period signal IGw sent from the ECU 8 and a feedback signal $S_{FB}$ sent from the feedback controlling means 6 described later. Further, the discharge driver 57 includes a gate voltage amplifier circuit 571 which amplifies a feedback drive signal $P_{FB}$ up to a predetermined gate voltage Vg. The feedback drive signal $P_{FB}$ is the logical AND signal obtained by the AND circuit 570.

The feedback controlling means 6 of the present embodiment, a main portion of the present invention, includes secondary current detector resistor 60 (resistance R0: for example, 10Ω) as the secondary current detecting means. The secondary current detector resistor 60 detects the secondary current $I_2$ flowing through the secondary coil 21 of the ignition coil unit 2. Further, the feedback controlling means 6 includes the secondary current feedback controlling circuit 61. The secondary current feedback controlling circuit 61 judges the detected secondary current $I_2$ on the basis of thresholds to feed back the detected secondary current $I_2$ for turn on/off operation of the discharge switch 56.

It should be noted that, in the present embodiment, the secondary current $I_2$ is converted into a secondary current detection voltage $V_{12}$ by the secondary current detector resistor 60 so as to be judged with thresholds.

The secondary current feedback controlling circuit 61 in the present embodiment is shown as an example, and the detailed configuration of the circuit can be modified appropriately, as long as the circuit can compares the detected secondary current $I_2$ with two thresholds ($V_{THR}/V_{THF}$) which are set as an upper limit and a lower limit to turn on/off the discharge switch 56.

The secondary current feedback controlling circuit 61 includes a hysteresis comparator as a main circuit. The hysteresis comparator obtains as an input the secondary current detection voltage $V_{12}$ which is the detection result converted to voltage by the secondary current detector resistor 60 detecting the secondary current $I_2$ flowing through the secondary coil 21 of the ignition coil unit 2. The hysteresis comparator judges the input with the two thresholds, and outputs the result as a high or low signal.

The secondary current feedback controlling circuit 61 includes a comparator 610, upper limit voltage dividing resistors 611 and 612, a lower limit voltage dividing resistor 613, limit changeover switch drive voltage dividing resistors 615 and 616, pull-up resistors 614 and 619, output inversion switch drive voltage dividing resistors 617 and 618, a pull-down resistor 620, a limit changeover switch 621, an output inversion switch 622 and a control source 623.

The secondary current detection voltage $V_{12}$ to which the secondary current $I_2$ is converted by the secondary current detector resistor 60 is inputted to the non-inverting input (+) of the comparator 610.

One of the upper limit voltage $V_{THR}$ and the lower limit voltage $V_{THF}$ is appropriately selected to be inputted to the inverting input (−) of the comparator 610.

A semiconductor switching device such as MOSFET is used in the limit changeover switch 621.

The drain (D) of the limit changeover switch 621 is connected to the control source 623 via the lower limit voltage dividing resistor 613 ($R_3$).

The source (S) of the limit changeover switch 621 is connected to ground.

The output of the comparator 610 is pulled up toward the control voltage ($V_{+B}$) of the control source 623 via the pull-up resistor 614 ($R_4$), and divided by the limit changeover switch drive voltage dividing resistors 615 ($R_5$) and 616 ($R_6$). The divided voltage is inputted to the gate (G) of the limit changeover switch 621.

Accordingly, the limit changeover switch 621 is ensured to be turned on/off according to the output of the comparator 610.

The limit changeover switch 621 is turned ON or OFF according to the output of the comparator 610. When the secondary current detection voltage $V_{12}$ is rising, the upper limit voltage $V_{THR}$ is inputted to the inverting input (−) of the comparator 610. When the secondary current detection voltage $V_{12}$ is falling, the lower limit voltage $V_{THF}$ is inputted to the inverting input terminal (−) of the comparator 610.

Specifically, when the limit changeover switch 621 is turned OFF, the upper limit voltage $V_{THR}$ ($=R_1 * V_{+B}/(R_1+R_2)$), which is the control voltage ($V_{+B}$) of the control source 623 divided by the upper limit voltage dividing resistors 611 ($R_1$) and 612 ($R_2$), is inputted to the inverting input (−). When the limit changeover switch 621 is turned ON, the lower limit voltage $V_{THR}$ ($=R_1/R_3 * V_{+B}/(R_1//R_3+R_2)$), which is the control voltage ($V_{+B}$) of the control source 623 divided by connecting the lower limit voltage dividing resistor 613 ($R_3$) in parallel to the upper limit voltage dividing resistors 611 ($R_1$) and 612 ($R_2$), is inputted to the inverting input (−).

For example, when the control voltage $V_{+B}$ is 5 V and the voltage dividing resistors $R_1$, $R_2$ and $R_3$ are 1.6 kΩ, 2 kΩ and 2 kΩ, respectively, the upper limit voltage $V_{THR}$=1.6*5/(2+1.6)≈2.2 V, and
the lower limit voltage $V_{THF}$=(1.6//2)*5/(2+1.6//2)≈1.5 V
are satisfied.

The auxiliary power source 5 is controlled to discharge or stop discharging by judging with the threshold that the secondary current detection voltage $V_{12}$ is within a range from 1.5 V to 2.2 V. Thus, the secondary current $I_2$ can be kept within a range from −150 mA to −220 mA without reversing the polarity.

On the other hand, the phase of the output of the comparator 610 is inverted by the output inversion switch 622 to conform the variation of the secondary current $I_2$ to the phase of switching of the discharge switch 56. The inverted output of the comparator 610 is outputted as the feedback signal $S_{FB}$ to the discharge driver 57.

The drain (D) of the output inversion switch 622 is connected to the control source 623 through the pull-up resistor 619, and connected to the discharge driver 57 through the pull-down resistor 620.

The source (S) of the output inversion switch 622 is connected to ground.

The output of the comparator 610 is pulled up to the control voltage $V_{+B}$ of the control source 623 by the pull-up resistor 619, divided by the voltage dividing resistor 617 ($R_7$) and 618 ($R_8$), and inputted to the gate (G) of the output inversion switch 622.

Therefore, the output inversion switch 622 is turned ON or OFF according to the change in the output of the comparator 610.

When the output of the comparator 610 is high, that is, the secondary current $I_2$ (the secondary current detection voltage $V_{12}$) is larger than the predetermined upper limit current $I_{THR}$ (the upper limit voltage $V_{THR}$), the output inversion switch 622 is turned ON. Accordingly, since the input terminal of the feedback signal $S_{FB}$ is connected to ground through the pull-down resistor 620, the feedback signal $S_{FB}$ becomes 0 (low).

When the output of the comparator 610 is low, i.e. the secondary current $I_2$ (the secondary current detection voltage $V_{12}$) is lower than the lower limit current $I_{THF}$ (the lower limit voltage $V_{THF}$), the output inversion switch 622 is turned OFF. Accordingly, since the input terminal of the feedback signal $S_{FB}$ is connected to the control source 623 thorough the pull-up resistor 619 and the pull-down resistor 620, the feedback signal $S_{FB}$ becomes 1 (high).

The discharge switch 56, which includes the AND circuit 570, accepts an input of the discharge period signal IGw and the feedback signal $S_{FB}$.

Therefore, if the discharge period signal IGw is 1 (high) and the feedback signal $S_{FB}$ is 1 (high), the output of the AND circuit 570 becomes 1 (high). Otherwise, the output of the AND circuit 570 becomes 0 (low). The output of the AND circuit 570 is inputted to the gate voltage amplifier circuit 571 as a feedback pulse $P_{FB}$.

The gate voltage Vg which has been amplified by the gate voltage amplifier circuit 571 is inputted to the gate (G) of the discharge switch 56. Thus, the discharge switch 56 is turned on/off, according to the ON or OFF state of the feedback pulse $P_{FB}$.

That is, when the secondary current $I_2$ exceeds the predetermined upper limit current $I_{THR}$, the output of the comparator 610 becomes high, and the feedback signal $S_{FB}$ becomes low. According to this, the discharge switch 56 is turned OFF, and therefore supply of the discharge energy from the auxiliary power source 5 is stopped. The upper limit current $I_{THR}$ serves as an OFF threshold of the discharge energy supply.

Further, when the secondary current $I_2$ falls below the predetermined lower limit current $I_{THF}$, the output of the comparator 610 becomes low and the feedback signal $S_{FB}$ becomes high. According to this, the discharge switch 56 is turned ON, and therefore the supply of the discharge energy from the auxiliary power source 5 is started. The lower limit current $I_{THF}$ serves as an ON threshold of the discharge energy supply.

If the discharge energy is supplied in a superimposing manner from the capacitor 54 to the primary coil 20 through the downstream side of the primary coil 20 at the discharge voltage Vdc, according to the change of the primary voltage $V_1$, the secondary voltage $V_2$ changes due to electromagnetic induction in proportion to the turn ratio ($N=N_2/N_1$) of the magnitude of the primary voltage $V_1$. Thus, the secondary current $I_2$ flows in a superimposing manner without reversing the polarity, and thereby the discharge is ensured to be maintained.

When: a primary input energy which is inputted to the primary coil 20 from the auxiliary power source 5 is $E_1(t)$; the voltage applied to the primary coil 20 is the primary voltage $V_1$; current flowing through the primary coil 20 is primary current $I_1$; a secondary input energy which is inputted to the secondary coil 21 is $E_2(t)$; the voltage applied to the secondary coil 21 is the secondary voltage $V_2$; and the current flowing through the secondary coil 21 is the secondary current $I_2$, the relationship of $$E_1(t)=\int V_1 I_1 dt = \in E_2(t) = \in \int V_2 I_2 dt$$

is satisfied.

Depending on the operating condition of the internal combustion engine 9, the secondary voltage $V_2$ changes from moment to moment. Especially, when a strong in-cylinder airflow occurs in the combustion chamber, the secondary voltage $V_2$ rises because of elongation of an electric arc.

When the discharge energy supplied from the auxiliary power source 5 is constant, the secondary current $I_2$ is unlikely to flow accordingly.

However, when the present invention is applied, even if the secondary voltage $V_2$ has any value, the secondary current $I_2$ is monitored, judged with upper and lower limits so as to be kept within a given range, and the result is fed back for on/off control of the discharge switch 56. With this configuration, the discharge energy $E_1(t)$ can be inputted from the auxiliary power source 5 to the ignition coil unit 2 in a suitable proportion.

Further, in this case, the thresholds ($V_{THR}/V_{THF}$) of the secondary current detection voltage $V_{12}$, the thresholds showing the upper and lower limits, can be produced by the secondary current feedback controlling circuit 61 in a closed manner, which can reduce processing load of the ECU 8.

Figure 2:
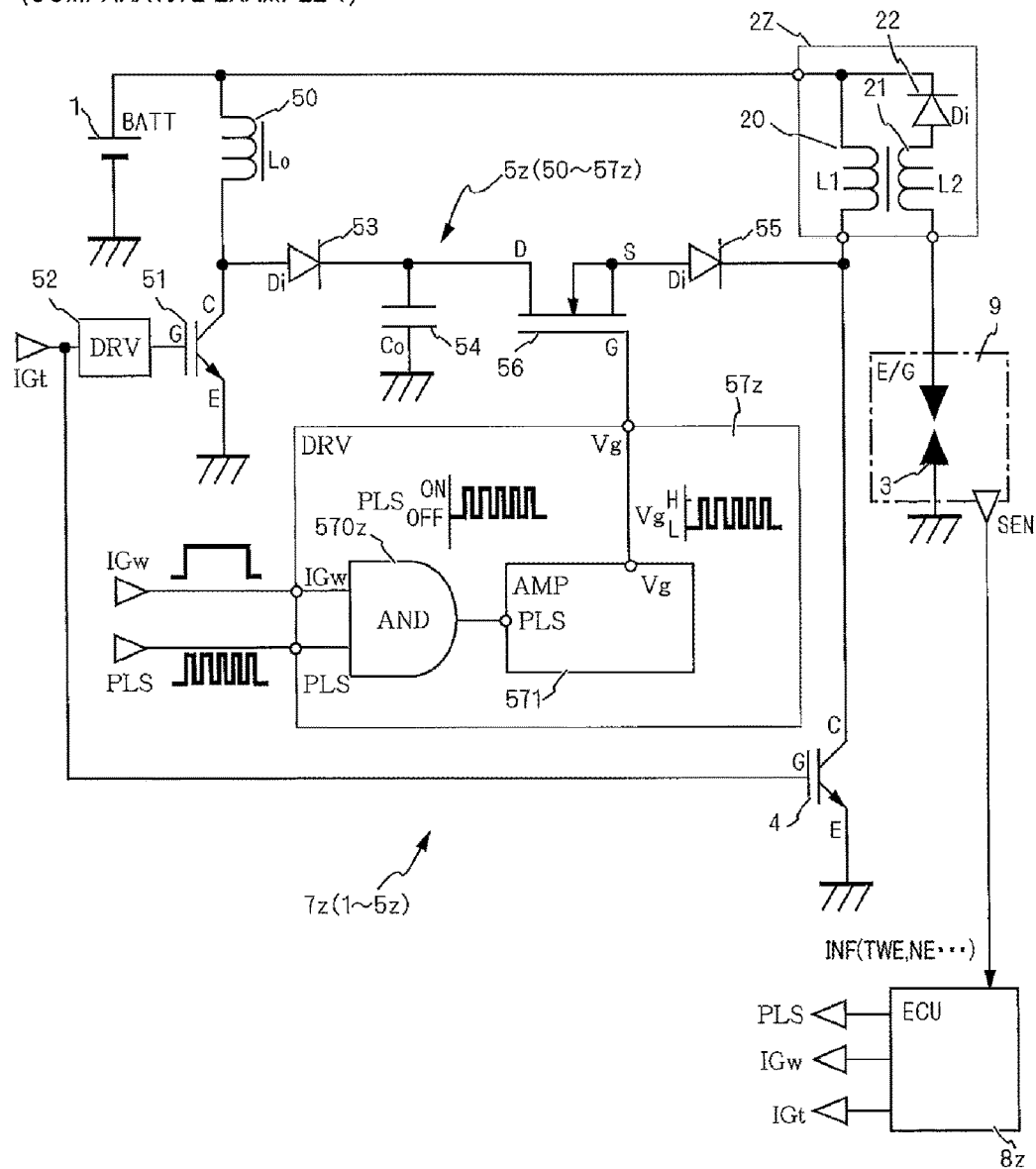
FIG. 2 is a schematic configuration diagram of an ignition device 7z including no feedback controlling means which is a main portion of the present invention.

With reference to FIG. 2, here is described, as Comparative Example 1, an outline of an ignition device 7z with an auxiliary power source which does not have the feedback function of the present invention.

The parts similar to the ignition device of the present invention are labeled with the same reference signs, and alphabet z is suffixed to the reference signs of the parts which are similar to but not the same as the ignition device of the present invention. Accordingly, the following description is provided focusing on the different parts, omitting description of the similar configurations.

Common to the ignition device 7, the ignition device 7z includes the auxiliary power source 5z which inputs energy to the primary coil 20 of the ignition coil unit 2 through the downstream side of the primary coil 20 after starting electrostatic discharge. In the ignition device 7z, an externally provided engine controller unit 8z obtains the operating condition information INF, such as an engine coolant water temperature TWE, a crank angle CA, an accelerator position THL and an engine rotation speed NE, the operating condition information being detected by the operating condition detecting means SEN detecting the operating condition of the internal combustion engine 9. To supply discharge energy depending on the operating condition, the engine controller unit (ECU) 8z sends a discharge switch drive pulse PLS preliminary calculated such as through map processing. The discharge driver 57z driving the discharge switch 56 outputs the gate voltage Vg according to the discharge drive pulse PLS to control switching of the discharge switch 56, the gate voltage Vg turning ON and OFF at a predetermined duty ratio. As described above, the ignition device 7z of the Comparative Example has a difference in that the discharge switch 56 is on/off-controlled on the basis of the discharge switch drive pulse PLS generated according to the operating condition.

Figure 3:
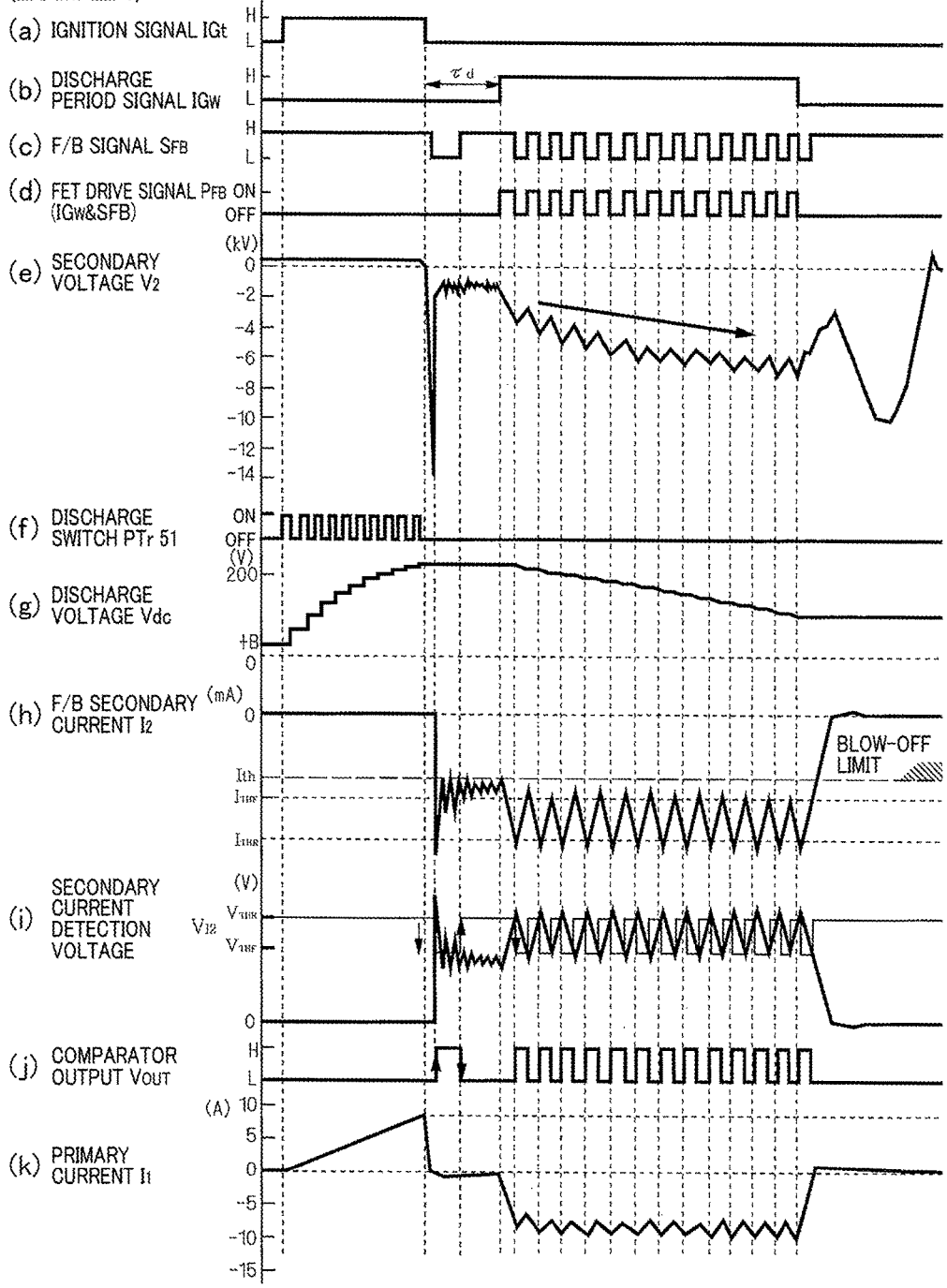
FIG. 3 is a timing diagram showing an operation of the ignition device 7 in Example of FIG. 1.
Figure 4:
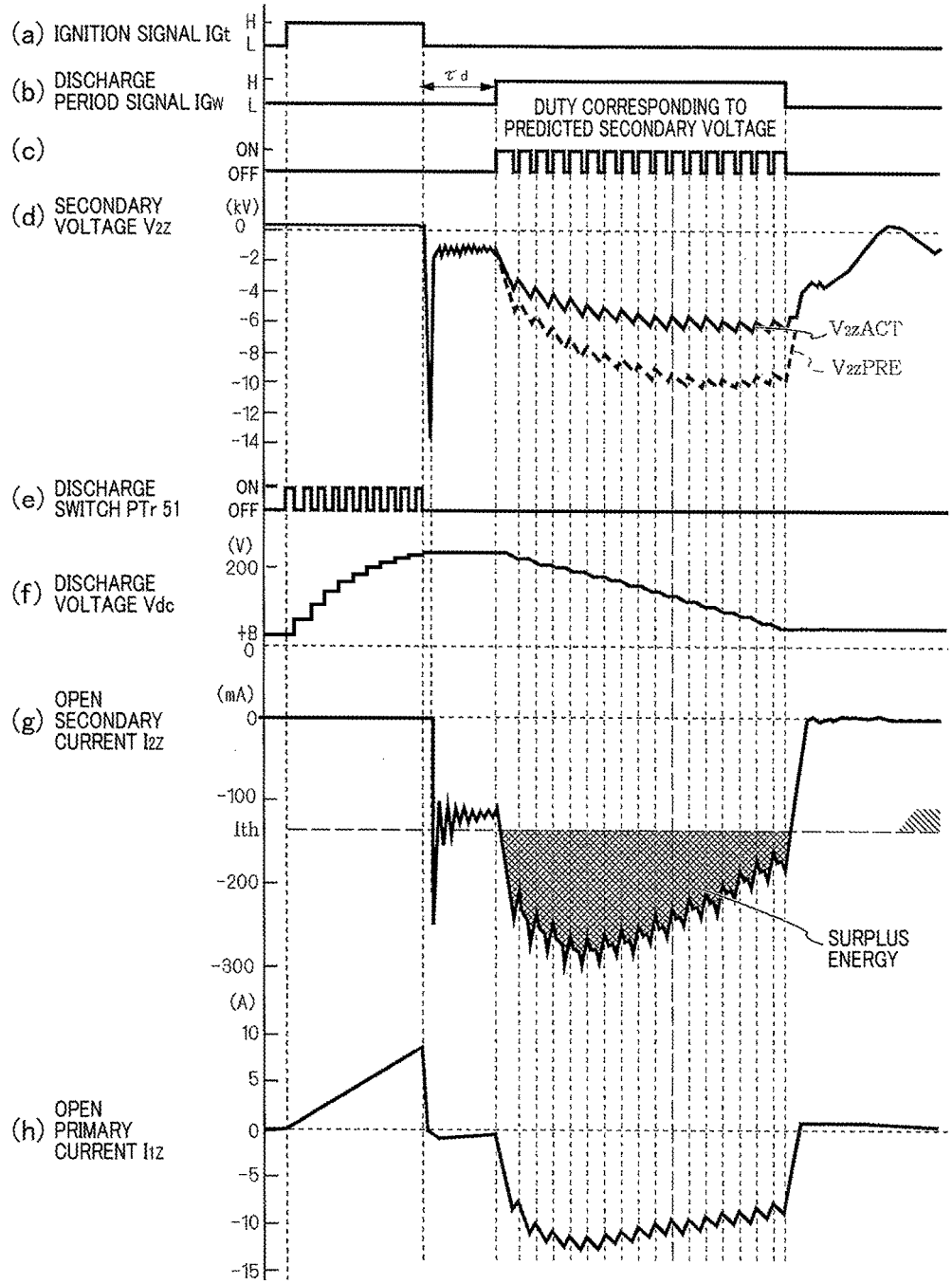
FIG. 4 is a timing diagram showing an operation of the ignition device 7z in the Comparative Example of FIG. 2.

With reference to FIGS. 3 and 4, hereinafter is described the difference between the operation of the ignition device 7 shown as Example 1 of the present invention and the operation of the ignition device 7z shown as Comparative Example 1.

It should be noted that the specific voltage and electric current shown in each diagram are only an example, can be modified appropriately, and should not be construed as limiting the present invention.

In Example 1, as shown in FIG. 3 (a), the ignition switch 4 is turned ON or OFF according to the ignition signal IGt which is sent from the ECU 8 coinciding with the ignition timing of the internal combustion engine 9.

As shown in FIG. 3 (k), if the primary current $I_1$ which has flowed through the primary coil 20 is interrupted by switching of the ignition switch 4, as shown in FIG. 3 (e), a high secondary voltage $V_2$ is generated in the secondary coil 21 of the ignition coil unit 2, and applied to the ignition plug 3. Thus, the dielectric between the center electrode and the ground electrode opposed to each other with a predetermined discharge gap therebetween breaks down, and the electrostatic discharge is started.

On the other hand, the capacitor 54 provided to the auxiliary power source 5 as the discharge energy accumulating means needs to accumulate enough energy before the discharge period signal IGw rises. Accordingly, as shown in FIG. 3 (g), the capacitor 54 is charged up at the comparatively high discharge voltage Vdc (for example, 100 V to hundreds of V).

In the present embodiment, the charge switch 51 is turned ON/OFF in synchronization with the rise of the ignition signal IGt, as shown in FIG. 3 (f). Thus, the energy accumulated in the choke coil 50 is accumulated in the capacitor 54, and thereby the capacitor 54 is charged so as to have the high discharge voltage Vdc while the ignition signal IGt is high (H), as shown in FIG. 3(g).

It should be noted that the charge of the capacitor 54 does not always need to start in synchronization with rising of the ignition signal IGt, but may start any time except for when the discharge period signal IGw is being outputted.

When a predetermined delay period $\tau d$ elapses from falling of the ignition signal IGt, i.e. from the start of discharge of the ignition plug 8, as shown in FIG. 3 (b), the discharge period signal IGw rises and discharge from the auxiliary power source 5 is allowed.

On the other hand, as shown in FIG. 3 (j), in the initial state, the output Vout of the comparator 610 is low, and therefore the limit changeover switch 621 is OFF.

Accordingly, the upper limit voltage $V_{THR}$ which is the voltage +B of the control source 623 divided by the voltage dividing resistors 611 and 612 is inputted to the inverting input (−) of the comparator 610.

If the secondary current $I_2$ is triggered by switching of the ignition switch 4 to start flowing as shown in FIG. 3 (h), the secondary current detection voltage $V_{12}$ inputted to the non-inverting input (+) exceeds the upper limit voltage $V_{THR}$, and therefore the output of the comparator 610 becomes ON, as shown in FIG. 3 (i). Thus, the limit changeover switch 621 is turned ON, and thereby the voltage dividing resistor 613 is connected parallel to the voltage dividing resistor 613. Thus, the voltage inputted to the inverting input (−) of the comparator 610 is switched to the lower limit voltage $V_{THF}$.

If the secondary current $I_2$ lowers as shown in FIG. 3 (h), the secondary current detection voltage $V_{12}$ falls below the lower limit voltage $V_{THF}$ accordingly as shown in FIG. 3 (i). Then, as shown in FIG. 3 (c), the feedback signal $S_{FB}$ becomes high (H) to start discharge from the auxiliary power source 5.

As shown in FIGS. 3 (b) and (c), if the discharge period signal IGw is high (H) and the feedback signal $S_{FB}$ is high (H) as well, the FET drive signal $P_{FB}$ which is the logical AND of them becomes ON, and thereby discharge from the auxiliary power source 5 is started, as shown in FIG. 3 (d).

As shown in FIGS. 3 (g) and (h), the capacitor 54 provided to the auxiliary power source 5 starts discharging. Thus, the primary voltage $V_1$ of the primary coil 20 increases, the voltage $V_2$ of the secondary coil 21 also increases in proportion to the turn ratio N, the secondary current $I_2$ increases, and thereby the electrostatic discharge is ensured to be kept.

If the secondary current detection voltage $V_{12}$ exceeds the upper limit voltage $V_{THR}$ with the increase of the secondary current $I_2$, the output of the comparator 610 becomes high (H) as shown in FIG. 3 (j). Thus, the feedback signal becomes low (L) as shown in FIG. 3 (c), the FET drive signal $P_{FB}$ is turned OFF as shown in FIG. 3 (d), and discharge from the auxiliary power source 5 stops.

Simultaneously, the limit changeover switch 621 is turned ON, and the lower limit voltage $V_{THF}$ is inputted to the inverting input (−), the lower limit voltage $V_{THF}$ being the control voltage +B divided by the voltage dividing resistor 612 ($R_{12}$) and the combined resistor ($R_{11}//R_{13}$) in which the voltage dividing resistor 611 and the voltage dividing resistor 613 are connected in parallel.

After the auxiliary power source 5 stops discharging, the secondary current $I_2$ gradually lowers as shown in FIG. 3 (h). If the secondary current detection voltage $V_{12}$ falls below the lower limit voltage $V_{THF}$ as shown in FIG. 3 (i), the output $V_{OUT}$ of the comparator 610 becomes low as shown in FIG. 3 (j). Thus, as shown in FIGS. 3 (c) and (d), the feedback signal $S_{FB}$ becomes high (H), the FET drive signal $P_{FB}$ becomes ON, discharge from the auxiliary power source 5 is started again, and the secondary current $I_2$ increases again.

By repeating these, the secondary current $I_2$ is judged on the basis of thresholds according to the change in the secondary current $I_2$ detected by the secondary current detection resistor 60, i.e. on the basis of the upper limit voltage $V_{THR}$ when the secondary current $I_2$ rises, and on the basis of the lower limit voltage $V_{THF}$ when the secondary current $I_2$ falls down, and the judgement result is fed back to turn on/off the discharge switch 56. Thus, the secondary current $I_2$ can be kept within a given range without reversing the polarity, as shown in FIG. 3 (*g*).

In the present embodiment, since the judgement is carried out while generating the thresholds in a closed manner, as shown in FIG. 3 (*i*), slight overshoot occurs after the secondary current detection voltage $V_{12}$ exceeds the upper limit voltage $V_{THR}$ and lowers below the lower limit voltage $V_{THF}$. However, since there is no need for externally inputting the thresholds, feedback control can be accurately performed with quite easy configurations.

Repeating increase and decrease depending on the operating condition of the internal combustion engine 9, as shown in FIG. 3 (*e*), the secondary voltage $V_2$ increases as a whole, and therefore maintaining discharge may gradually become difficult. Even in such a case, since discharge or discharge stop of the auxiliary power source 5 is controlled according to the change of the detected secondary current $I_2$, the secondary current $I_2$ can be kept in a given range for a long period, and stable ignition can be realized.

As shown in FIG. 3 (*b*), if the discharge period signal IGw becomes low, the FET drive signal $P_{FB}$ is forcibly tuned OFF as shown in FIG. 3 (*d*), and discharge from the auxiliary power source 5 stops.

With reference to FIG. 4, the outline of the operation of Comparative Example 1 will be described. In Comparative Example 1, in a manner similar to Example 1, after the high secondary voltage $V_2$ is applied to the ignition plug 8 by switching of the ignition switch 4, discharge from the auxiliary power source 5 is started.

However, Comparative Example 1 differs in the following points. That is, the ECU 8*z* has a preliminarily prepared map, sends the drive pulse PLS according to the map, and the drive voltage Vg which controls switching of the discharge switch 56 is generated according to the drive pulse PLS. In the map, the duty ratio is defined in anticipation of the increase in the secondary voltage $V_{2Z}$, according to the operating condition of the internal combustion engine.

In the actual internal combustion engine 9, because of aged deterioration of each operating condition detecting means SEN, a fuel injection valve and the like, the actual condition do not always correspond completely to the condition preliminarily prepared for the map.

Further, in the map, in view of safety factor, the discharge energy supplied from the auxiliary power source 5*z* is sometimes defined larger such that the secondary current $I_{2Z}$ is necessarily kept larger than the blow-off limit current Ith.

Accordingly, even if the actual secondary voltage $V_{2Z}$ACT shown with the continuous line in the FIG. 4(*d*) is lower than the predicted secondary voltage $V_2$PRE shown with the dot line in FIG. 4(*d*), the discharge switch 56*z* of the auxiliary power source 5*z* is turned on/off on the basis of the duty preliminarily defined in the map. The predicted secondary voltage $V_2$PRE is predicted from the detection result of the operating condition detecting means SEN detecting the operation information INF of the internal combustion engine 9.

As a result, as shown in FIG. 4(*g*), the secondary current $I_{2Z}$ greatly exceeding the blow-off limit current Ith unavoidably flows, and, as can be seen, the energy inputted from the auxiliary power source is excessive in the part covered with crossing hatched lines.

With reference to FIG. 5, the effects to the change in the operating condition of the internal combustion engine, in the ignition device 7 of Example 1 of the present invention and the ignition device 7*z* of Comparative Example 1 will be described.

In Example 1, under high speed operating condition, the secondary current detection voltage $V_{12}$ is judged with thresholds such that the secondary current $I_2$ is kept within a given range, regardless of the change in the secondary voltage $V_2$, and the result is fed back for supply or stop of discharge energy from the auxiliary power source 5. On the other hand, in Comparative Example 1, the increase in the secondary current $I_2$ is predicted, and the map is preliminarily prepared to control supply or stop of discharge energy from the auxiliary power source 5*z*. According to the map, the discharge switch 56 is controlled so as to be turned on/off.

Accordingly, in Example 1, as shown on the left in FIG. 5, even if the operating condition of the internal combustion engine is changed to high-speed, medium-speed, and low-speed, the secondary current $I_2$ is regulated within a given range by the feedback control.

On the other hand, in Comparative Example 1, during medium-speed, the secondary current $I_{2Z}$ can be regulated within a given range for stabilization. However, when the internal combustion engine is at high-speed, supply of discharge energy becomes insufficient, which might cause the secondary current $I_{2Z}$ to lower below the blow-off limit current Ith. At low-speed, the input energy from the auxiliary power source 5*z* might become excessive.

Further, in Comparative Example 1, the ECU 8*z* executes operation using the map according to the operating information INF indicating the operating condition obtained from the operating condition detecting means SEN, and generates the drive pulse PLS driving the discharge switch 56*z*. Accordingly, the processing load on the ECU 8*z* is large. Especially, during ignition, since many operations, such as injection control of fuel, are simultaneously carried out using the operating information INF sent from the operating condition detecting means SEN, it is preferred to reduce the processing load on the ECU as much as possible.

<Second Embodiment>

Figure 6:
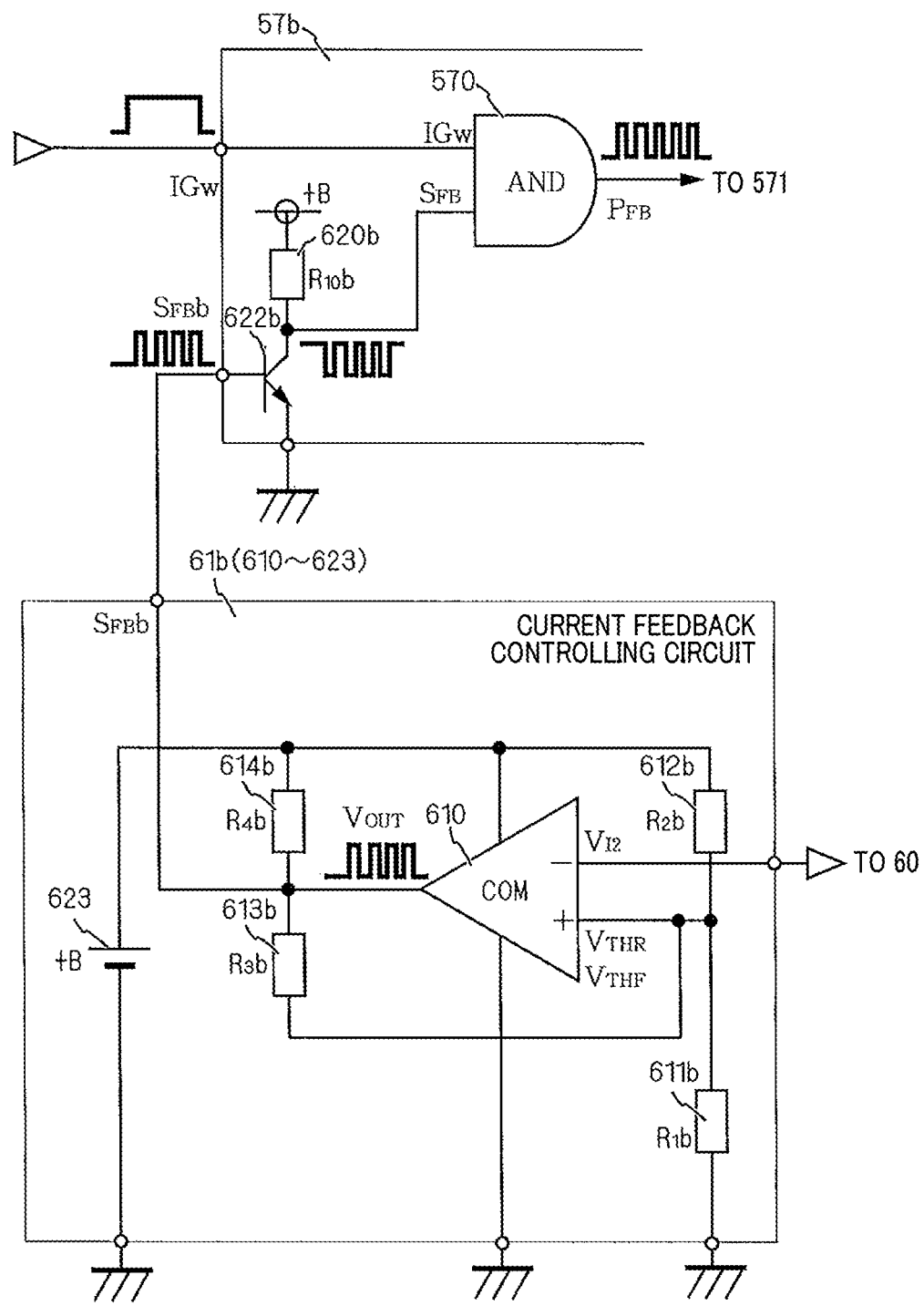
FIG. 6 is a configuration diagram showing a main portion of an ignition device 7b in a second embodiment of the present invention.

With reference to FIG. 6, hereinafter is described an ignition device 7*b* according to a second embodiment of the present invention.

It should be noted that the description of configurations similar to the above embodiment is omitted, and that only configurations of a feedback controlling means 6*b* and a driving driver 57*b*, which are characteristic of the present invention, are described.

Example 1 shows the following configuration having hysteresis. That is, the limit changeover switch 621 is driven using the output $V_{OUT}$ of the comparator to change the voltage inputted to the inverting input (−). On the other hand, in present embodiment, the secondary current detection voltage $V_{12}$ is inputted to the inverting input (−), and the control voltage +B of the control source 623 is proportionally divided by voltage dividing resistors 611*b* and 612*b* and inputted to the non-inverting input (+). Further, in present embodiment, the output Vout of the comparator 610 is fed back through the lower limit voltage dividing resistor 613*b* to provide hysteresis, which is different from the foregoing embodiment.

Further, in this modification, the output Vout pulled up to the control voltage of the control source 623 through a pull-up resistor 614*b* is connected to the base (B) of an output inversion switch 622*b* built in a driver 57*b*. The emitter (E) of the output inversion switch 622b is connected to ground. The collector (C) of the output inversion switch 622b is pulled up to the control voltage $V_{+B}$ through the pull-up resistor 620b, and the pulled-up output is connected to the AND circuit 570b.

Such a configuration can also serve in a manner similar to Example 1.

<Third Embodiment>

Figure 7:
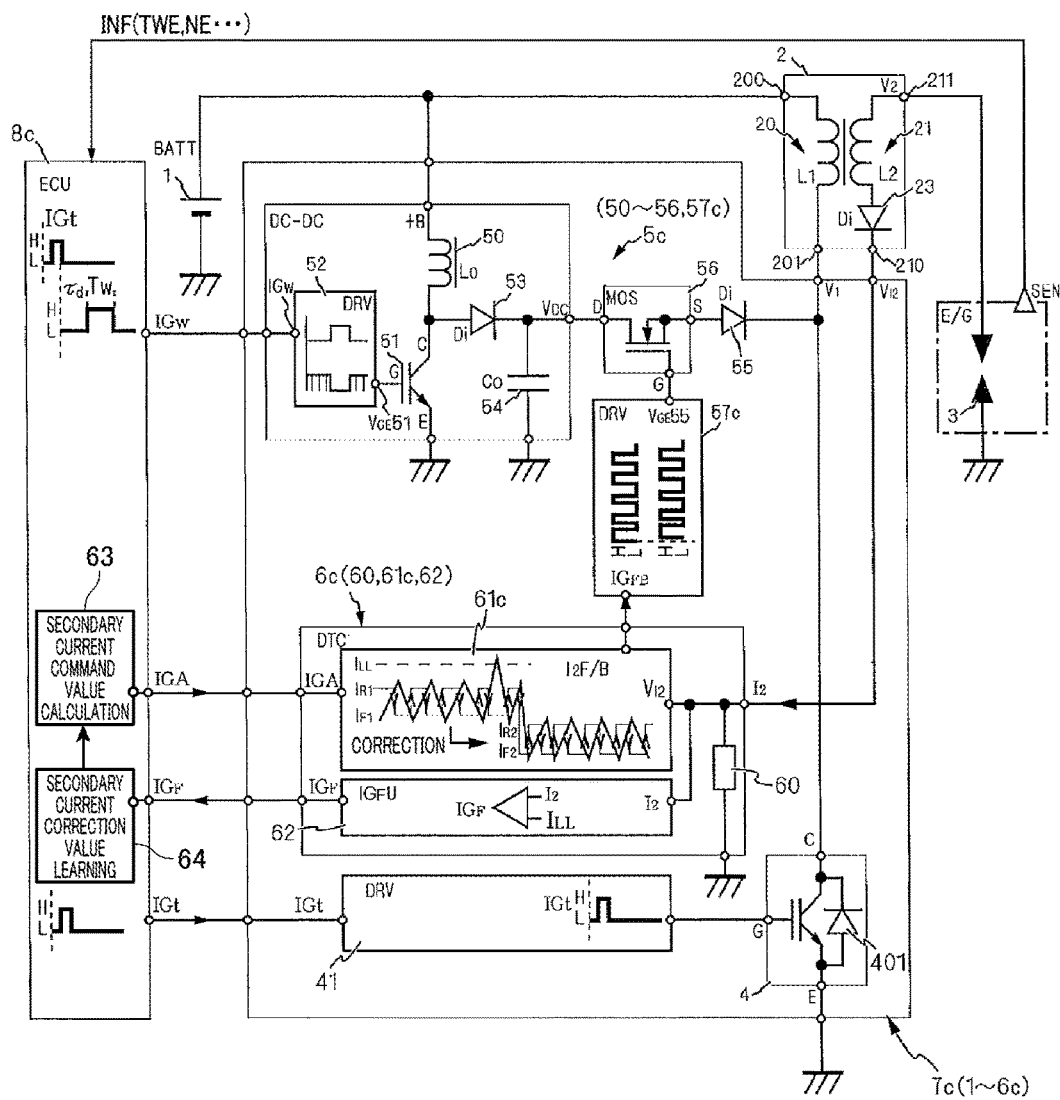
FIG. 7 is a schematic configuration diagram showing an ignition device 7c in a third embodiment of the present invention.

With reference to FIG. 7, hereinafter is described an ignition device 7c according to a third embodiment of the present invention.

The present embodiment includes the configurations of the above embodiment, and differs in that the secondary current feedback controlling means 6c includes a secondary current feedback circuit 61c, a discharge blow-off detecting means IG$_F$U62, a secondary current command value calculating means 63, and a secondary current learning means 64. The discharge blow-off detecting means IG$_F$U62 detects the occurrence of discharge blow-off of the secondary current I$_2$ due to in-cylinder airflow in the combustion chamber, and sends a discharge blow-off signal IG$_F$. The secondary current command value calculating means 63 calculates a secondary current target value I$_2$I as a target, according to the operating condition. The secondary current learning means 64 corrects the secondary current target value I$_2$I as a target, according to whether the discharge blow-off has occurred.

It should be noted that the discharge blow-off detecting means IG$_F$U62, the secondary current command value calculating means 63, and the secondary current learning means 64 may be provided to the secondary current feedback controlling means 6, or a part (the secondary current command value calculating means 63 and the secondary current learning means 64) of them may be provided to the ECU 8c side as shown in FIG. 7.

In the following embodiments, when electric current is judged with thresholds, easy handling is achieved by appropriately using a detected electric current value and an electric current threshold converted into a voltage value. Thus, the predetermined judgement with thresholds can be instantaneously carried out with an analog circuit, such as a comparator, or a hybrid digital analog circuit.

The discharge blow-off detecting means IG$_F$U62 compares the secondary current I$_2$ detected by the secondary current detecting means 60 with the predetermined blow-off detection current threshold I$_{LL}$. If the secondary current I$_2$ becomes lower than the predetermined value, the discharge blow-off detecting means IG$_F$U62 determines that the blow-off of the discharge has occurred, and outputs the discharge blow-off signal IG$_F$.

In the actual circuit, the secondary current conversion voltage $V_{I2}$ which is the secondary current I$_2$ converted into a voltage is compared such as by a comparator with a blow-off detection current threshold conversion voltage $V_{LL}$ which is the blow-off detection current threshold I$_{LL}$ converted into a voltage.

The secondary current command value calculating means 63 calculates the target value I$_2$I of the secondary current I$_2$ as a target according to the operating condition of the internal combustion engine.

Specifically, the secondary current target values I$_2$I in accord with the operating condition, such as the engine speed NE, the engine coolant water temperature TWE, and the accelerator position, are preliminarily stored as map data. The secondary current command value calculating means 63 chooses a proper secondary current target value I$_2$I from the map data on the basis of the engine parameters inputted to the ECU 8c from the sensors SEN provided on the internal combustion engine 9 side, and outputs the chosen result as the secondary current changeover signal IGA to the secondary current feedback controlling circuit 61c.

In the secondary current feedback controlling circuit 61c, a secondary current upper limit I$_{THR}$ and a secondary current lower limit I$_{THF}$ are set centering around the secondary current target value I$_2$I, and feedback control is performed in a manner similar to the above embodiments. Thus, the spark discharge caused by the secondary current having the same polarity is maintained.

The secondary current learning means 64 increases or decreases the secondary current correction learning value I$_2$L correcting the secondary current target value I$_2$I, according to the presence or absence of the blow-off detection signal IG$_F$.

If it is determined that there is a need for correcting the secondary current target value I$_2$I, the secondary current learning means 64 inputs the secondary current correction learning value I$_2$L to the secondary current command value calculating means 63.

A new secondary current target value I$_2$I+I$_2$L which is the secondary current target value I$_2$I corrected with the secondary current correction learning value I$_2$L is inputted as a new I$_2$I to the secondary current feedback controlling circuit 61c, and control is performed, with the target of the secondary current I$_2$ being increased.

Figure 8:
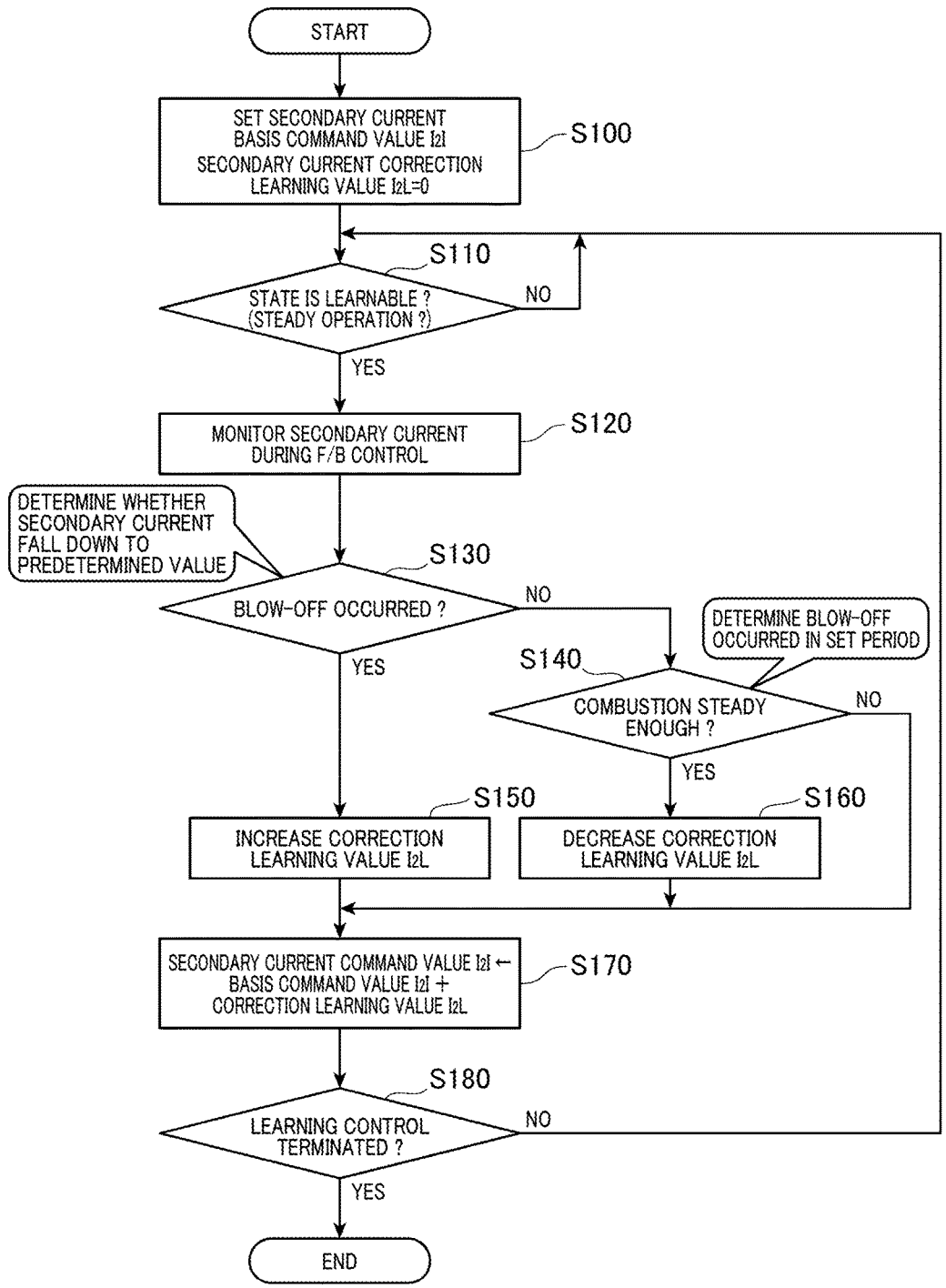
FIG. 8 is a flow diagram showing an example of a secondary current learning method used in the ignition device 7c of FIG. 7.

With reference to FIG. 8, the following description sets forth an example of the secondary current leaning method (the operation of the secondary learning means 64) used for the ignition device 7c.

In an initial value setting step S100, the secondary current command value calculating means 63 sets the secondary current basis command value I$_2$I according to the operating condition, and the secondary current learning means 64 sets an initial value of the secondary current correction learning value to I$_2$L=0.

In learnability determining step S110, it is determined whether the device is in a learnable, i.e. the device is in a steady operation.

Whether the device is in a steady operation can be determined on the basis of the engine parameters, such as engine rotation speed NE, obtained from the sensors SEN provided to the internal combustion engine 9.

If the device is in a steady operation, the judgement is Yes, and the flow proceeds to step S120. If the device is not in a steady operation at this timing, the judgement is No, and the loop of step S110 is repeated.

In second current monitoring step S120, the second current I$_2$ inputted to the second current feedback controlling circuit is monitored.

Subsequently, the flow proceeds to blow-off occurrence determining step S130.

In blow-off occurrence determining step S130, the occurrence of blow-off is determined according to whether the secondary current falls down close to 0 mA.

If blow-off is detected in a predetermined learning period (discharge period) during one combustion stroke, the judgement is Yes, and the flow proceeds to step S150. If blow-off is not detected, the judgement is No, and the flow proceeds to step S140.

Specifically, the secondary current I$_2$ is compared to the blow-off detection current threshold I$_{LL}$. If the secondary current I$_2$ is lower than the blow-off detection current threshold I$_{LL}$, the secondary current learning means 64 determines that blow-off has occurred.

The blow-off detection current threshold $I_{LL}$ is set to a predetermined value (for example, 0 to 50 mA) which is equal to or smaller than the blow-off limit current Ith.

It should be noted that, in the determination of the presence or absence of blow-off, occurrence of blow-off may be determined by one detection performance. Alternatively, in order to prevent error, if the secondary current $I_2$ is detected to be below the blow-off detection current threshold $I_{LL}$ a plurality of times within one determination period, it may be determined that the blow-off has occurred.

In the combustion state determining step S140, it is determined whether blow-off has occurred in a predetermined period.

If blow-off has not occurred in the predetermined period, i.e., the combustion state is stable, the judgement is Yes, and the flow proceeds to step S160. If blow-off is detected, the judgement is No, and the flow proceeds to step S170.

In the correction learning value $I_2L$ increasing step S150, the secondary current learning means 64 increases the correction learning value $I_2L$, and the flow proceeds to S170. With the increment being 10 mA to 50 mA, for example, at one time, the correction learning value $I_2L$ is increased stepwise.

In the correction learning value $I_2L$ decreasing step S160, the secondary current learning means 64 decreases the correction learning value $I_2L$, and the flow proceeds to S170. This is because when the combustion is stable, waste of energy is minimized by decreasing the target value of the secondary current $I_2$.

In the secondary current command value calculating step S170, the secondary current learning means 64 stores the sum of the basis command value $I_2I$ and the correction learning value $I_2L$ as the secondary current command value $I_2I$.

Thus, in the secondary current feedback controlling circuit 61c, feedback control is performed such that the secondary current $I_2$ is kept within a predetermined current range centering around the corrected secondary current command value $I_2I$ as the secondary current target value.

In step S180, it is determined whether the learning control is terminated.

If the learning control is not terminated, the judgement is No, and the flow returns to the step S100. Then, the loop of the steps S110 to S170 is repeated using the corrected secondary current command value $I_2I$ as the basis.

If the learning control is terminated, the judgement is Yes, and the flow is terminated.

It should be noted that after correcting the secondary current command value $I_2I$, the operation may be performed predetermined number of times using the control value after correction, and thereafter the secondary current command value $I_2I$ may be returned to the secondary current basis command value.

Figure 9:
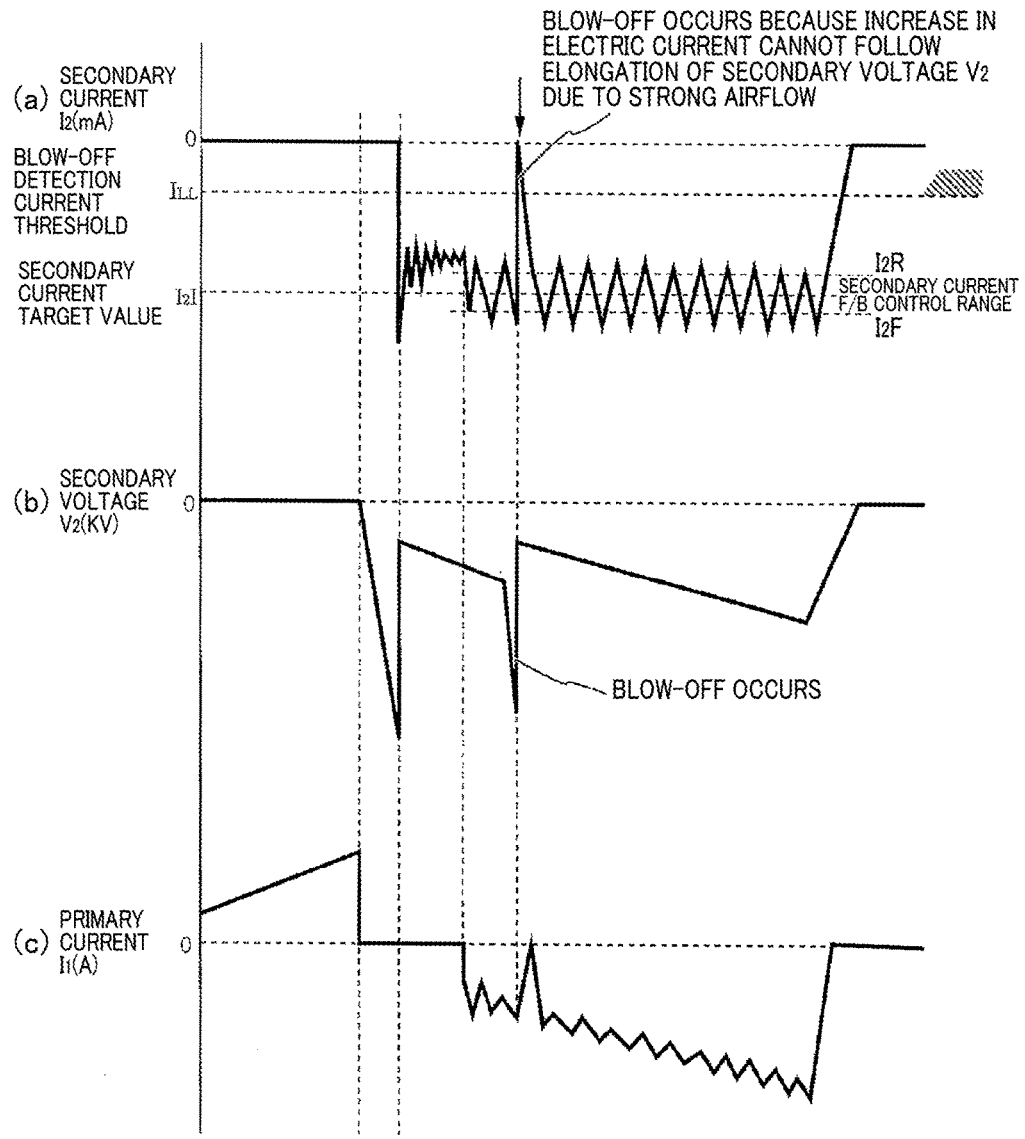
FIG. 9 is a timing diagram showing a problem which occurs when no secondary current learning means is provided.

With reference to FIG. 9, hereinafter are described problems occurring when there is no secondary current learning function.

FIG. 9(a) shows a secondary current waveform when blow-off occurs because of strong in-cylinder airflow, FIG. 9(b) shows a secondary voltage waveform at that time, and FIG. 9(c) shows a primary current waveform.

When the device has no secondary current learning function which is the main part of the present embodiment, the following secondary current feedback control is performed. That is, the secondary current $I_2$ is detected, and discharge from the auxiliary power source 5 is controlled such that the secondary current $I_2$ is within a given range, while keeping the same polarity, regardless of the change in the secondary voltage $V_2$. It has been considered that, with this feedback control, the auxiliary power source 5 can supply the discharge energy in a suitable proportion.

However, it is found out that when the discharge arc is elongated by an extremely strong in-cylinder airflow and the secondary voltage $V_2$ extremely rises as shown in FIG. 9(b), supply of discharge energy from the auxiliary power source 5 cannot follow the change and becomes insufficient, which might cause blow-off as shown in FIG. 9(a).

Figure 10A:
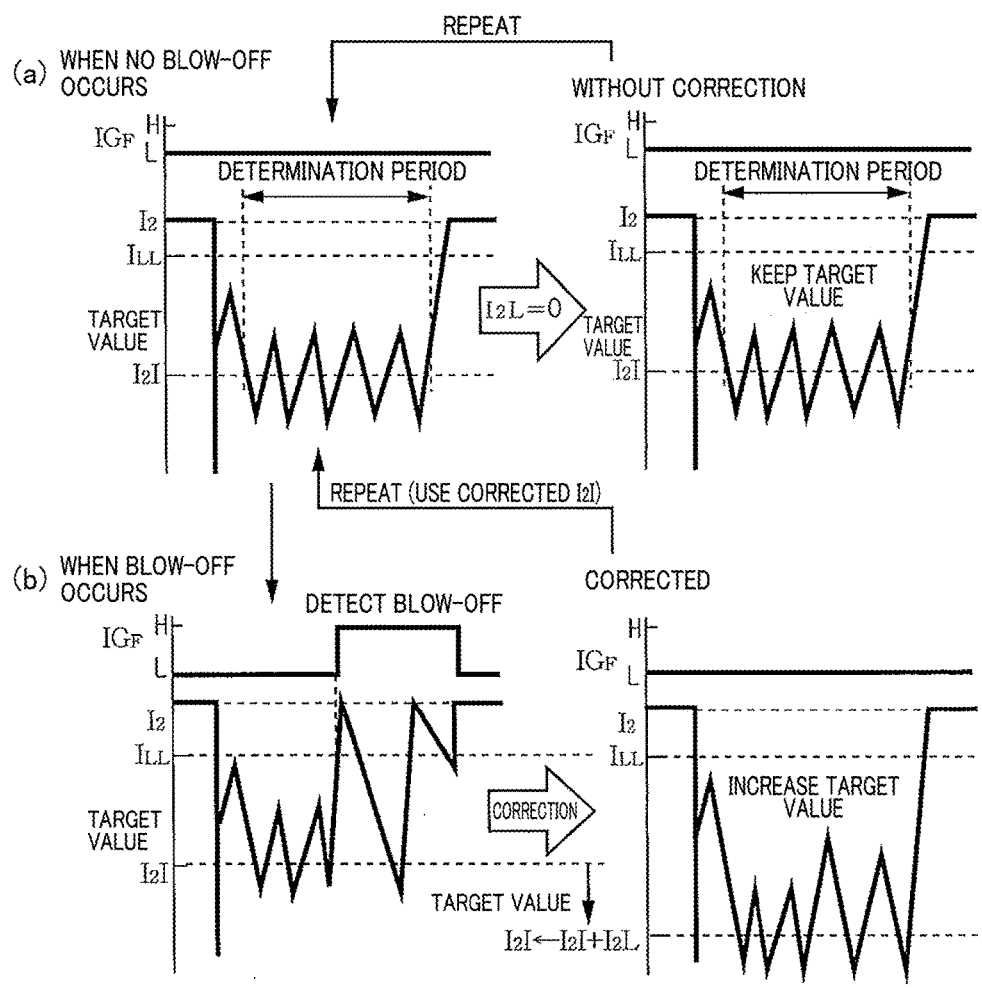
FIG. 10A is a characteristic diagram for describing the effect of the secondary current learning means.
Figure 10B:
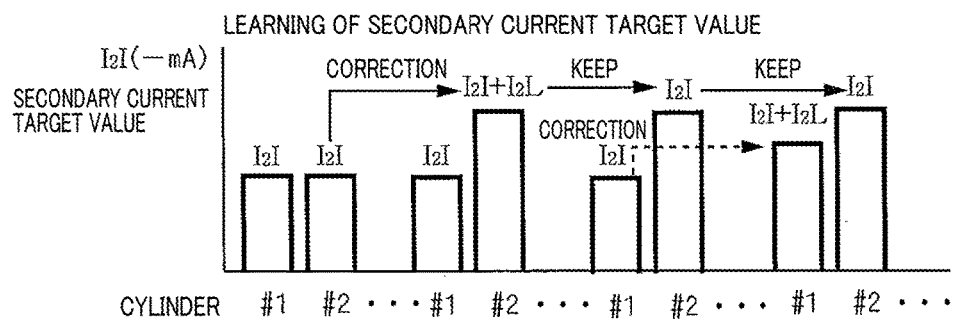
FIG. 10B is a schematic diagram showing a method for reflecting the learning effect of the secondary current learning means.

With reference to FIGS. 10A and 10B, hereinafter are described the effects achieved by the correction of the secondary current target value of the ignition device 7c in the third embodiment.

The ignition device 7c of the present invention determines necessity of the correction during the discharge period Tw according to the secondary current learning method described above.

As shown in (a) of FIG. 10A, if blow-off does not occur, the discharge blow-off signal $IG_F$ remains unchanged at 0, the correction learning value $I_2L$ maintains the initial value of 0, the secondary current target value $I_2I$ maintains the initially set basis command value $I_2I$, and the necessity of correction at the next combustion stroke is determined. If the correction is unnecessary, the determination is repeated, with the secondary current target value $I_2I$ maintaining the initially set basis command value $I_2I$.

As shown in (b) of FIG. 10A, if blow-off is detected, the blow-off detection signal $IG_F$ rises.

In response to this, the correction learning value $I_2L$ is increased, the target value is increased to the secondary current command value $I_2I$ which is the sum of the basis command value $I_2I$ and the correction learning value $I_2L$, and feedback control is performed centering around the corrected secondary current command value $I_2I$.

Accordingly, even if an electric arc is elongated by a strong in-cylinder airflow, because the target value of the secondary current becomes larger, the auxiliary power source 5 discharges more discharge energy, and thereby discharge can be kept without the occurrence of blow-off.

In the cylinder where the second current command value is increased, the subsequent discharge is performed using the corrected target value $I_2I$ as a basis, occurrence of blow-off in a predetermined determination period is determined, and the secondary current command value is increased or decreased according to the above-described correction flow, as needed.

Further, as shown in FIG. 10B, in a multicylinder engine, a basis command value $I_2I$ for the secondary current $I_2$ is provided on a per-cylinder basis, and the correction learning value $I_2L$ is increased or decreased according to the blow-off detection result obtained during each discharge period.

As a result, in order to reflect the effects of learning performed by the secondary current learning means, as shown in FIG. 10B, a correction learning value suitable for each cylinder can be also set. Specifically, the secondary current learning means can convert the correction learning value $I_2L$ of each cylinder into data suitable for each correction amount, and send the converted result as bit data, which is arranged in order of the cylinder number, from the ECU 8c to the secondary current feedback controlling circuit 6c.

Conventionally, even if the cylinders differ in ignitability because of variation such as in flow speed and temperature during combustion, input energy after ignition is determined being adjusted to the cylinder having the worst ignitability, which results in input of excessive ignition energy to other cylinders. According to the present embodiment, this problem can be solved, and discharge energy in each cylinder can be further precisely managed.

The secondary current learning correction need not be performed at each combustion stroke, may be performed at a constant updating interval.

Figure 11A:
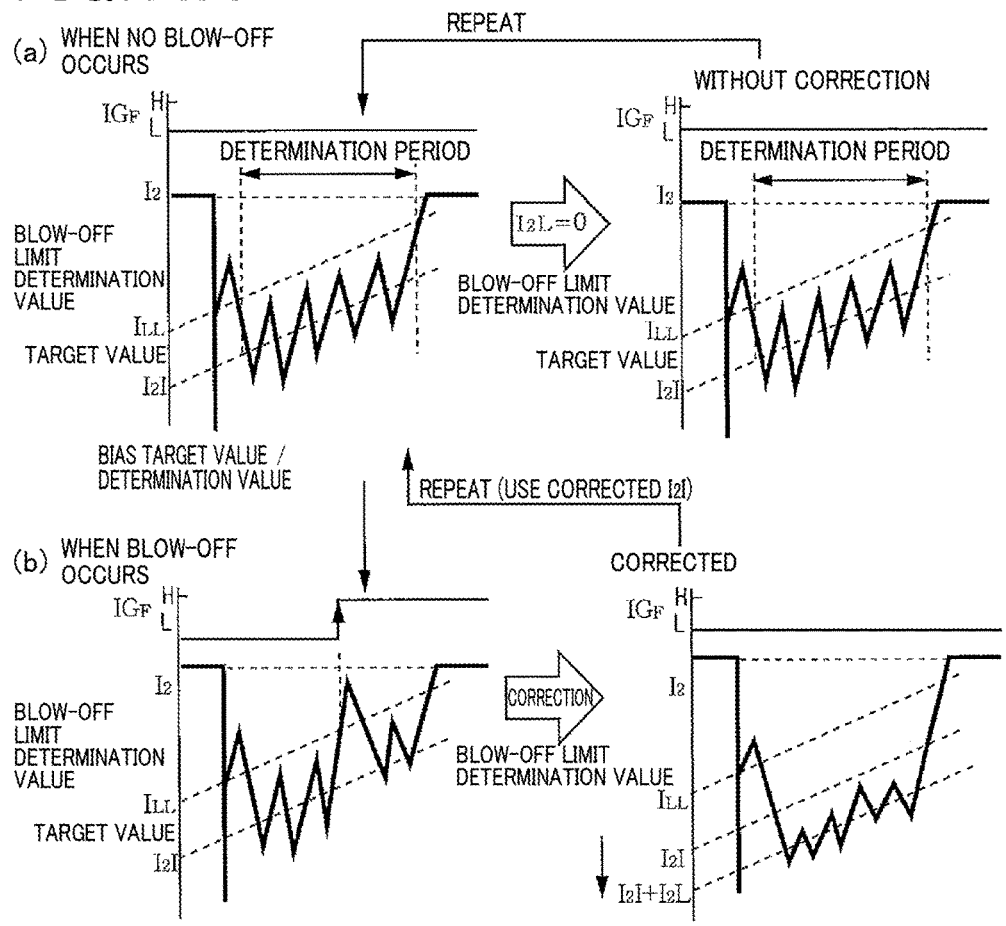
FIG. 11A is a characteristic diagram for describing a modification of the secondary current learning means.
Figure 11B:
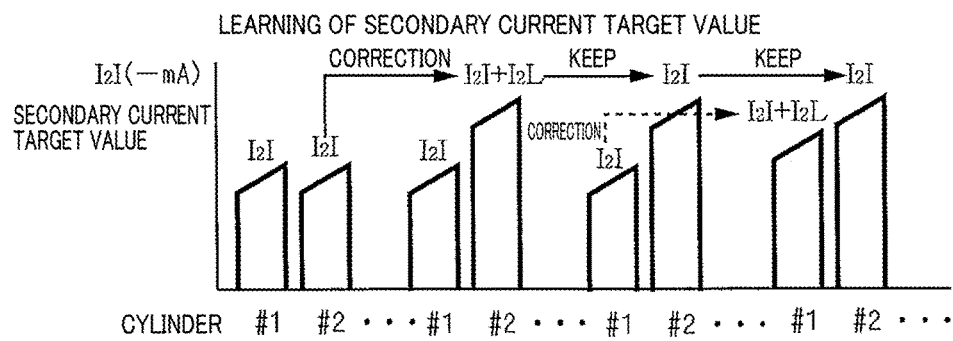
FIG. 11B is a schematic diagram showing a method for reflecting the learning effect of the modification of the secondary current learning means.

With reference to FIGS. 11A and 11B, hereinafter is described a modification of the secondary current learning means.

In the above embodiment, the secondary current target value $I_2I$ and the determination value $I_{LL}$ are set to constant values throughtout the range of the discharge period. However, as in the present modification, the secondary current target value $I_2I$ and the determination value $I_{LL}$ may be biased so as to be decreased with time.

As the occurrence timing of blow-off is earlier, the inputted amount of combustion energy is smaller, and therefore the ignition probability lowers. Accordingly, by providing the blow-off detection current threshold $I_{LL}$ with a gradient, the determination value $I_{LL}$ immediately after start of discharge becomes larger, and therefore blow-off is more likely to be detected.

Contrary to this, even if blow-off is determined at a later stage of discharge, the probability of ignition occurring due to the already inputted discharge energy is comparatively large. Accordingly, the determination value $I_{LL}$ is set to a comparatively small value.

This modification also exerts an effect similar to the above embodiment, as shown in FIGS. 11A and 11B. Further, energy consumption can be minimized at a later stage of discharge where ignitability is little affected.

Figure 12A:
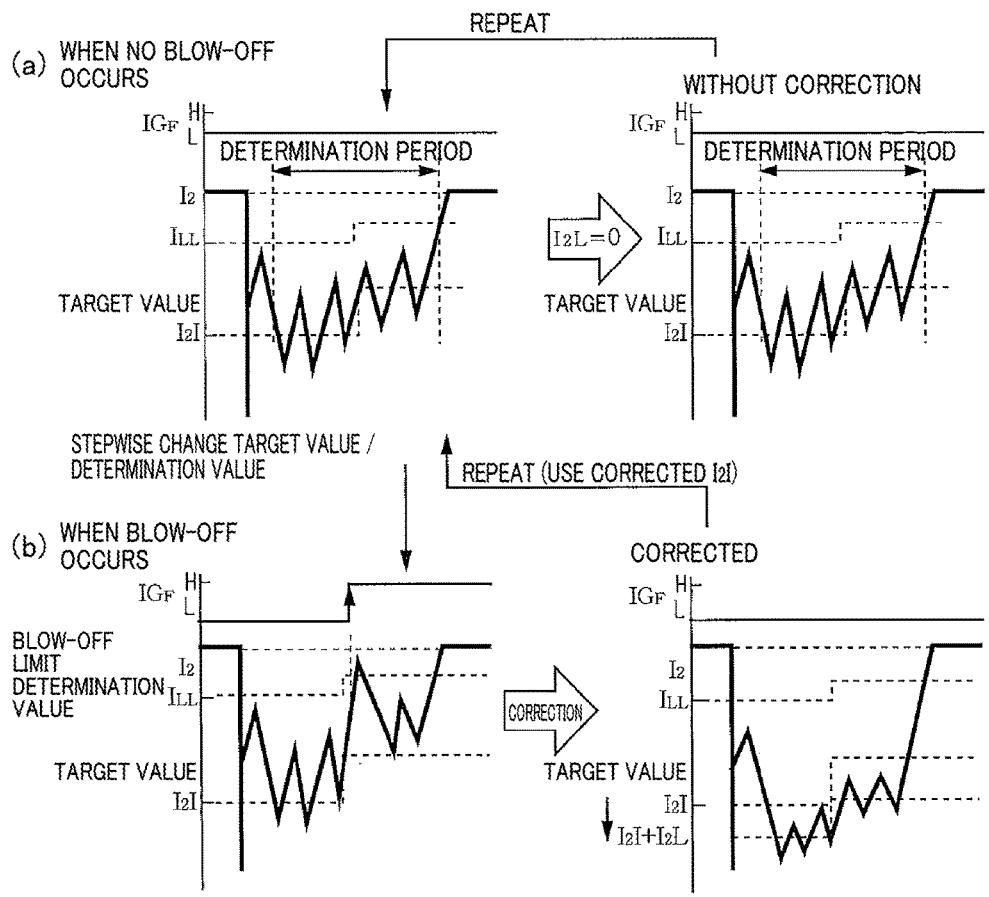
FIG. 12A is a characteristic diagram for describing another modification of the secondary current learning means.
Figure 12B:
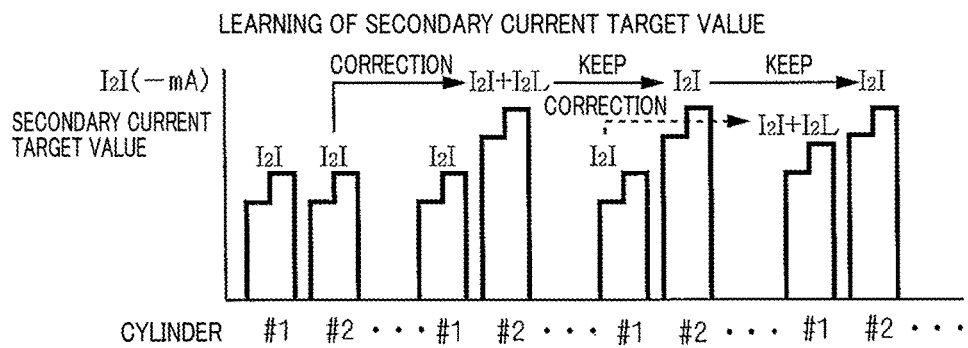
FIG. 12B is a schematic diagram showing a method for reflecting the learning effect of the another modification of the secondary current learning means.

With reference to FIGS. 12A and 12B, hereinafter is described another modification of the secondary current learning means.

As shown in FIGS. 12A and 12B, the secondary current target value $I_2I$ and the determination value $I_{LL}$ may be decreased stepwise.

This modification also exerts an effect similar to the modification shown in FIGS. 11A and 11B.

<Fourth Embodiment>

Figure 13:
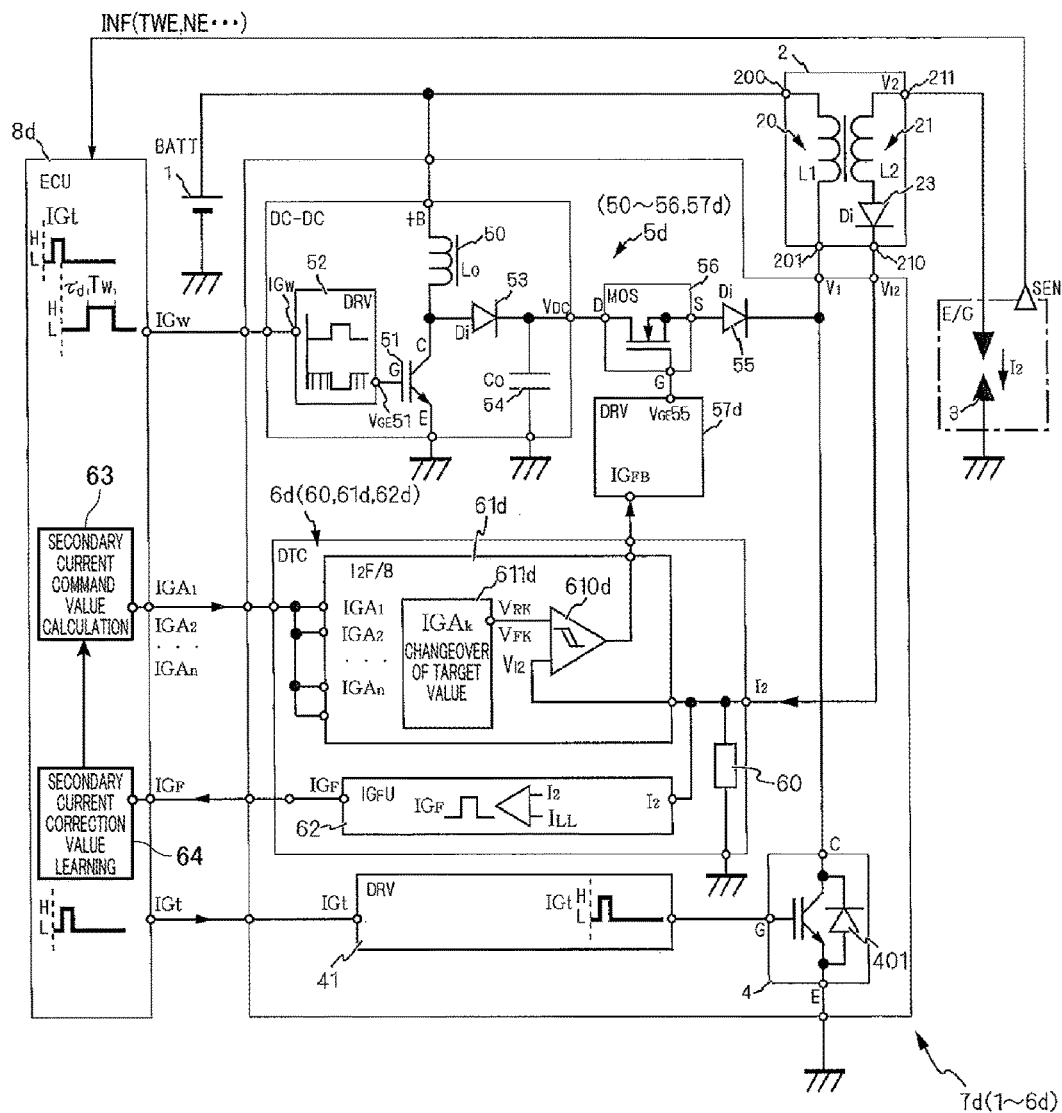
FIG. 13 is a schematic configuration diagram showing an ignition device 7d in a fourth embodiment of the present invention.

With reference to FIG. 13, hereinafter is described an ignition device 7d according to a fourth embodiment of the present invention.

In the present embodiment as well, as in the above embodiment, the feedback control is performed by turning on/off the discharge switch 56, according to judging with thresholds the secondary current $I_2$ inputted to the secondary current feedback controlling circuit 6d, such that the secondary current $I_2$ is kept within a given range. The above embodiment shows the configuration where one current command value $I_2I$ is sent from the ECU 8c to the feedback controlling circuit 6c. However, the ignition device 7d of present embodiment differs in the following point. That is, in present embodiment, a plurality of current changeover signals IGA1, IGA2, . . . , and IGAn are used as the current changeover signal IGA, and sent to the secondary current feedback controlling circuit 6d.

With this configuration, the target value of the secondary current $I_2$ can be readily switched.

<Fifth Embodiment>

Figure 14:
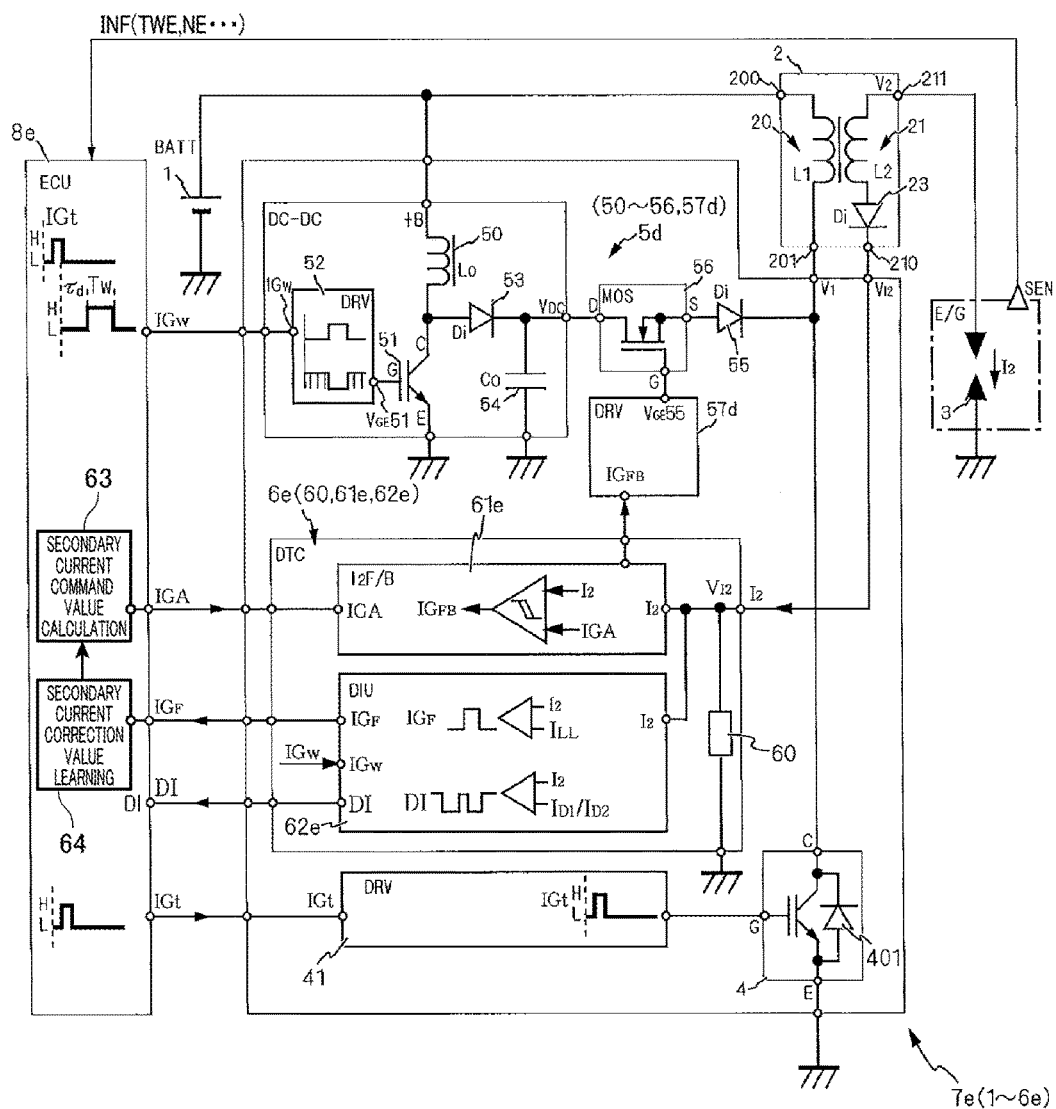
FIG. 14 is a schematic configuration diagram showing an ignition device 7e in a fifth embodiment of the present invention.

With reference to FIG. 14, hereinafter is described an outline of an ignition device 7e according to a fifth embodiment of the present invention.

Similar to the ignition devices 7c and 7d in the third and fourth embodiments, in the present embodiment, the secondary current feedback controlling means 6e includes, in addition to the configurations of the first embodiment, the secondary current feedback controlling circuit 61e, the discharge blow-off detecting means $IG_FU62e$, and the secondary current learning means 64. The discharge blow-off detecting means $IG_FU62$ detects whether blow-off of the secondary current $I_2$ has occurred because of the in-cylinder airflow in the combustion chamber, and sends the discharge blow-off signal $IG_F$. The secondary current command value calculating means 63 calculates the secondary current target value $I_2I$ as a target, according to the operating condition. The secondary current learning means 64 and the secondary current command value calculating means 63 correct the secondary current target value $I_2I$ as a target, according to whether discharge blow-off has occurred.

Further, the ignition device 7e differs in that the discharge blow-off detecting means $IG_FU62e$ not only detects blow-off but also serves as a self-diagnosis unit (DIU) 62e. The self-diagnosis unit (DIU) 62e detects malfunction of the ignition coil unit 2, the ignition switch 4 and the auxiliary power source 5 on the basis of the secondary current $I_2$, and sends a self-diagnosis signal DI to the ECU 8e.

The self-diagnosis unit 62e according to the present embodiment receives the discharge period signal IGw, and, at predetermined timing (first malfunction determination delay period $_T1$ and second malfunction determination delay period $_T2$, described later) in the discharge period, compares the secondary current $I_2$ detected by the secondary current detecting means 60 to a predetermined secondary current threshold (first delay period current threshold $I_{D1}$ and second delay period current threshold $I_{D2}$, described later). Thus, the self-diagnosis unit 62e can determine which of the ignition coil unit 2, the ignition switch 4 and the auxiliary power source (energy input portion) 5 has caused malfunction, by using malfunction determining methods described later.

In the present embodiment as well, as in the above embodiments, the detection result of the secondary current $I_2$ is fed back for on/off control of the discharge switch 56, so that the secondary current $I_2$ is kept within a given range of the same polarity. Thus, both of minimization of blow-off and optimization of discharge energy can be realized.

Further, in present embodiment as well, the modifications of the above embodiments may be appropriately adopted.

Figure 15:
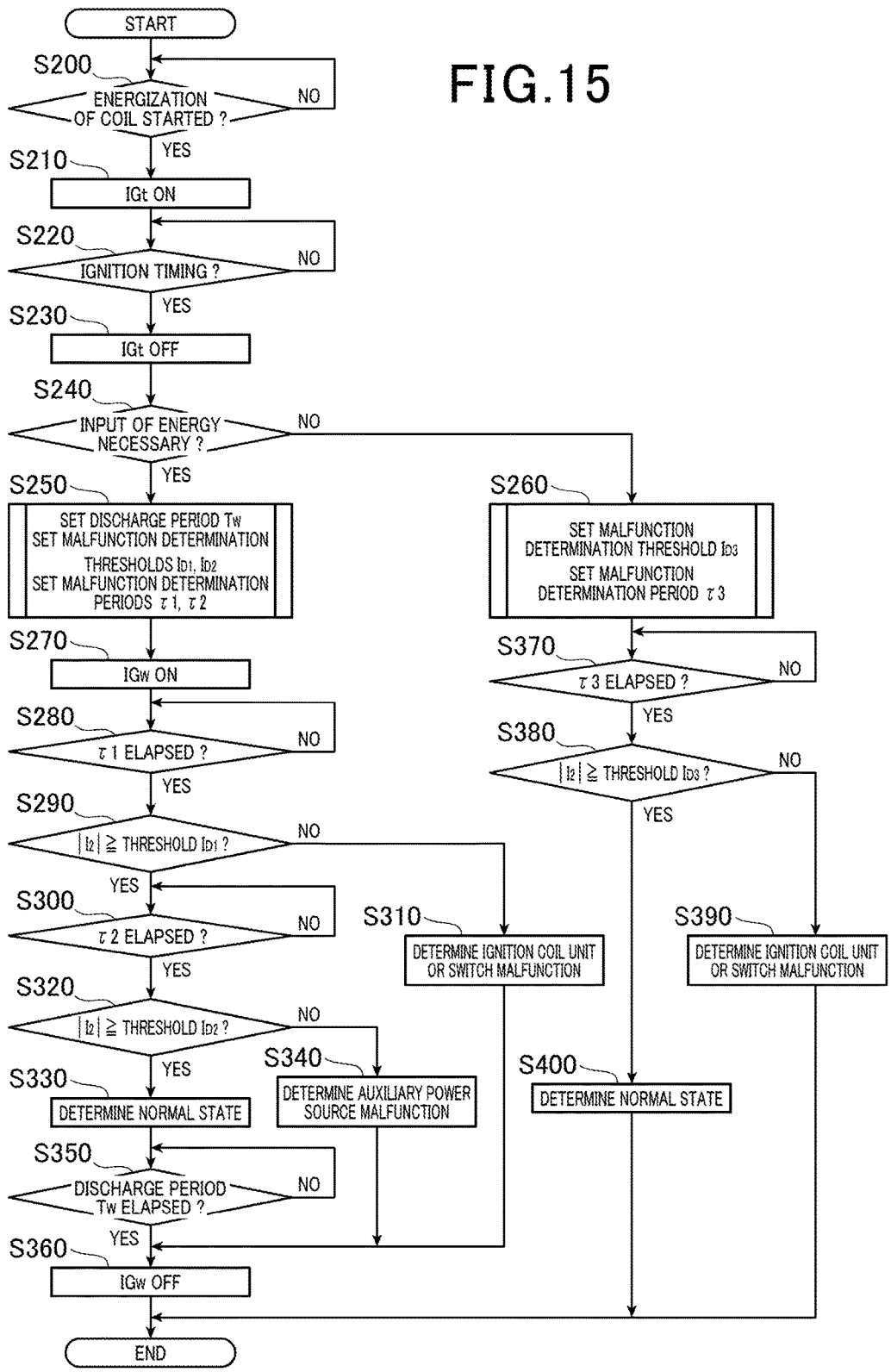
FIG. 15 is a flow diagram showing an example of malfunction determining method used in the ignition device 7e of FIG. 14.

With reference to FIG. 15, hereinafter is described an example of the malfunction determining method used in present embodiment.

In present embodiment, the self-diagnosis unit 62e configuring the malfunction determining means carries out normality determining step (S330). In the normality determining step, if at least the secondary current $I_2$ is equal to or larger than the first delay period current threshold $I_{D1}$ and equal to or larger than the second delay period current threshold $I_{D2}$, the self-diagnosis unit 62e determines the ignition coil unit 2, the ignition switch 4 and the auxiliary power source 5 are normal. Further, the malfunction determining means carries out auxiliary power source malfunction determining step (S340). In the auxiliary power source malfunction determining step, if the secondary current $I_2$ is equal to or larger than the first delay period current threshold $I_{D1}$ and below the second delay period current threshold $I_{D2}$, the malfunction determining means determines the auxiliary power source 5 has malfunctioned. Further, the malfunction determining means carries out ignition coil unit and ignition switch malfunction determining step (S310). In the ignition coil unit and ignition switch malfunction determining step, if the secondary current $I_2$ is smaller than the first delay period current threshold $I_{D1}$, the malfunction determining means determines that one of the ignition coil unit 2 and the ignition switch 4 has malfunctioned.

Hereinafter is describe a specific example.

In coil energization start determining step S200, the ECU 8e determines the necessity for starting energizing the ignition coil unit 2.

That is, if energization of the ignition coil unit 2 is required to be started, the judgement is Yes, and the flow proceeds to step S210. If it is not the timing for starting energizing the ignition coil unit 2, the judgement is No, and the loop of step S200 is repeated until the judgement becomes Yes.

Whether energization of the ignition coil unit 2 is required to be started is determined on the basis of the crank angle CA and the like which has been inputted to the ECU 8e.

In ignition signal outputting step S210, the ECU 8e outputs the ignition signal IGt.

Aside from the malfunction determining flow shown in FIG. 15, according to the above-described control flow, in response to ON of the ignition signal IGt, the ignition switch 4 is turned ON, energization from the battery 1 to the ignition coil unit 2 is started, and thereby the primary coil 20 accumulates energy.

Subsequently, keeping the ON state of the ignition signal IGt, the flow proceeds to ignition timing determining step S220.

If the ignition timing in accord with the operating condition of the internal combustion engine has been reached, the judgement is Yes, and the flow proceeds to step S230.

If not, the judgement is No, and the loop of step S220 is repeated until the ignition timing is reached.

In the ignition step S230, the ECU 8e stops the ignition signal IGt.

Thus, the ignition switch 4 is opened and the electric current flowing through the primary coil 20 is interrupted, which generates a high primary voltage $V_1$ at the primary coil. Thus, the secondary voltage $V_2$, which is higher than the primary voltage $V_1$ by a factor of the turn ratio ($N=N_2/N_1$), is generated at the secondary coil 21 due to electromagnetic induction, and the high voltage $V_2$ is applied to the ignition plug 3.

If the secondary voltage $V_2$ exceeds the dielectric voltage of the discharge space between the center electrode and the ground electrode which are provided at the top of the ignition plug 3, spark discharge occurs between the electrodes.

On the other hand, in auxiliary energy necessity determining step S240, the necessity of discharge from the auxiliary power source 5 is determined.

In this step, as an auxiliary energy necessity determining means, for example, the ECU 8e stores therein a map preliminarily set according to the operating condition of the engine, and determines the necessity of auxiliary energy according to the map depending on the engine parameters.

If discharge from auxiliary power source 5 is determined to be necessary in a map area set as an area which needs the input of energy, the judgement is Yes, and the flow proceeds to step S250. If discharge from auxiliary power source 5 is determined to be unnecessary in a map area set as an area which does not need the supply of energy, the judgement is No, and the flow proceeds to step S260.

In auxiliary energy discharge period condition setting step S250, the ECU 8e sets the discharge energy input period Tw, the first delay period current threshold $I_{D1}$, the second delay period current threshold $I_{D2}$, the first malfunction determination delay period $_T1$, and the second malfunction determination delay period $_T2$.

In main discharge period condition setting step S260, the ECU 8e sets the third delay period current threshold $I_{D3}$ and the third malfunction determination delay period $_T3$.

In steps S250 and S260, specific setting values are chosen from the preliminarily set map data according to the operating condition.

In IGw outputting step S270, the discharge period signal IGw is outputted.

When the outputted IGw is received, the discharge switch 56 is turned on/off, and the supply of discharge energy from the auxiliary power source 5 is started.

During discharge from the auxiliary power source 5, feedback control is performed by the above-described secondary current feedback controlling circuit 6e such that the secondary current $I_2$ is within a given range.

In first delay period elapse determining step S280, it is determined whether the first delay period $_T1$ has elapsed from the rise of the discharge period signal IGw.

If the first delay period $_T1$ has elapsed from the rise of the IGw, the judgement is Yes, and the flow proceeds to step S290.

If the first delay period $_T1$ has not elapsed yet, the judgement is No, and the loop of step S280 is repeated until the first delay period $_T1$ elapses.

In first malfunction determining step S290, judgement with a threshold is carried out by comparing the delay period current threshold $I_{D1}$ to the secondary current $I_2$ detected by the secondary current detecting means 60 at the time when the first delay period $_T1$ elapses.

If the absolute value of the secondary current $I_2$ is equal to or larger than the first delay period current threshold $I_{D1}$, the judgement is Yes, and the flow proceeds to step S300.

If the absolute value of the secondary current $I_2$ is below the first delay period current threshold $I_{D1}$, the judgement is No, and the flow proceeds to step S310.

In ignition coil unit and ignition switch malfunction determining step S310, because the absolute value of the secondary current $I_2$ is below the first delay period current threshold $I_{D1}$, the self-diagnosis unit 62e determines the malfunction has occurred in either of the ignition coil unit 2 and the ignition switch 4, and sends the ECU 8e the self-diagnosis signal D1 corresponding to the determination result. Thereafter, the flow proceeds to step S360.

In second delay period elapse determining step S300, it is determined whether the second delay period $_T2$ has elapsed from the rise of the discharge period signal IGw.

If the second delay period $_T2$ has elapsed from the rise of IGw, the judgement is Yes, and the flow proceeds to step S320.

If the second delay period $_T2$ has not elapsed, the judgement is No, and the loop of step S300 is repeated until the delay period $_T1$ elapses.

In second malfunction determining step S320, judgement with a threshold is carried out by comparing the second delay period current threshold $I_{D2}$ to the secondary current $I_2$ detected by the secondary current detecting means 60 at the time when the second delay period $_T2$ elapses.

If the absolute value of the secondary current $I_2$ is equal to or larger than the second delay period current threshold $I_{D2}$, the judgement is Yes, and the flow proceeds to step S330.

If the absolute value of the secondary current $I_2$ is below the second delay period current threshold $I_{D2}$, the judgement is No, and the flow proceeds to step S340.

In normality determining step S330, because the secondary current $I_2$ is equal to or larger than the first delay period current threshold $I_{D1}$ and equal to or larger than the second delay period current threshold $I_{D2}$ at the given timing, all of the ignition coil unit 2, the ignition switch 4 and the auxiliary power source 5d are determined to be normal, and the flow proceeds to step S350.

In auxiliary power source malfunction determining step S340, because the secondary current $I_2$ is equal to or larger than the first delay period current threshold $I_{D1}$ and below the second delay period current threshold $I_{D2}$, the ignition coil unit 2 and the ignition switch 4 are determined not to have malfunctioned, and the auxiliary power source 5d is determined to have some kind of malfunction. Accordingly, the self-diagnosis unit 62e sends the ECU 8e the self-diagnosis signal D1 corresponding to the determination result, and the flow proceeds to step S360.

In energy input period elapse determining step S350, it is determined whether the discharge period Tw has elapsed.

If the discharge period Tw has elapsed, the judgement is Yes, and the flow proceeds to step S360.

The judgement is NO until the discharge period Tw elapses, and the loop of step S350 is repeated until the discharge period Tw elapses.

In discharge period stopping step S360, the discharge period signal IGw is stopped, and the malfunction determining step performed when the discharge of energy from the auxiliary power source 5d is necessary is terminated.

On the other hand, if the supply of energy from the auxiliary power source 5d is determined unnecessary in step S240 and the flow proceeds to step S260 and further proceeds to step S370, in third delay period elapse determining step S370, it is determined whether the third delay period $_T3$ has elapsed.

If the third delay period $_T3$ has elapsed from the fall of IGt, the judgement is Yes, and the flow proceeds to step S290.

If the third delay period $_T3$ has not elapsed yet, the judgement is No, and the loop of step S280 is repeated until the delay period $_T1$ elapses.

In third delay period malfunction determining step S380, judgement with a threshold is carried out by comparing the third delay period current threshold $I_{D3}$ to the absolute value of the secondary current $I_2$ at the time when the third delay period $_T3$ elapses.

If the absolute value of the secondary current $I_2$ is equal to or larger than the third delay period current threshold $I_{D3}$, the judgement is Yes, and the flow proceeds to step S400.

In ignition coil unit and ignition switch normality determining step S400, because the discharge current $I_2$ flowing when the high voltage is applied from the ignition coil unit 2 to the ignition plug exceeds the predetermined current threshold, the ignition coil unit 2 and the ignition switch 4 have no malfunction, and thus are determined to be normal by the self-diagnosis unit 62e. After that, the malfunction determining flow is terminated.

In ignition coil unit and switch malfunction determining step S390, because the secondary current $I_2$ is not detected or below the predetermined current threshold $I_{D3}$, the self-diagnosis unit 62e determines the ignition coil unit 2 or the ignition switch 4 has some malfunction, and sends the ECU 8e the self-diagnosis signal D1 corresponding to the determination result. Thereafter, the malfunction determining flow is terminated.

In the present embodiment, the ECU 8e and the self-diagnosis unit 62e in cooperation execute the above flow (S280 to S350 and S370 to S400) of the malfunction determining means. As an alternative, the ECU 8e may be configured to serve as the self-diagnosis unit 62e.

With reference to FIGS. 16A, 16B, 16C, 16D and 16E, hereinafter are described the effects of the malfunction determining means provided to the ignition device 7e of FIG. 14.

Figure 16A:
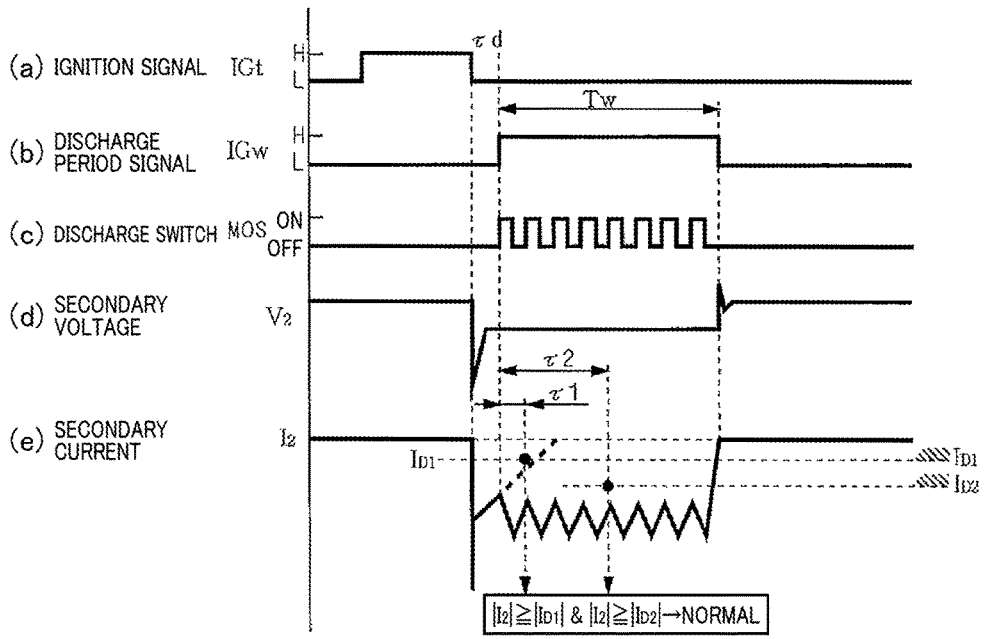
FIG. 16A is a timing diagram showing the effect of a malfunction determining means of an auxiliary power source provided to the ignition device 7e of FIG. 14, and showing a case where a discharge from the auxiliary power source 5d is detected and normality is determined.

As shown in FIG. 16A, if all of the ignition coil unit 2, the ignition switch 4 and the auxiliary power source 5d are normal, at the time when the predetermined malfunction determination times $_T1$ and $_T2$ each elapse, the secondary current $I_2$ is determined to be normal on the basis of the predetermined thresholds $I_{D1}$ and $I_{D2}$.

Figure 16B:
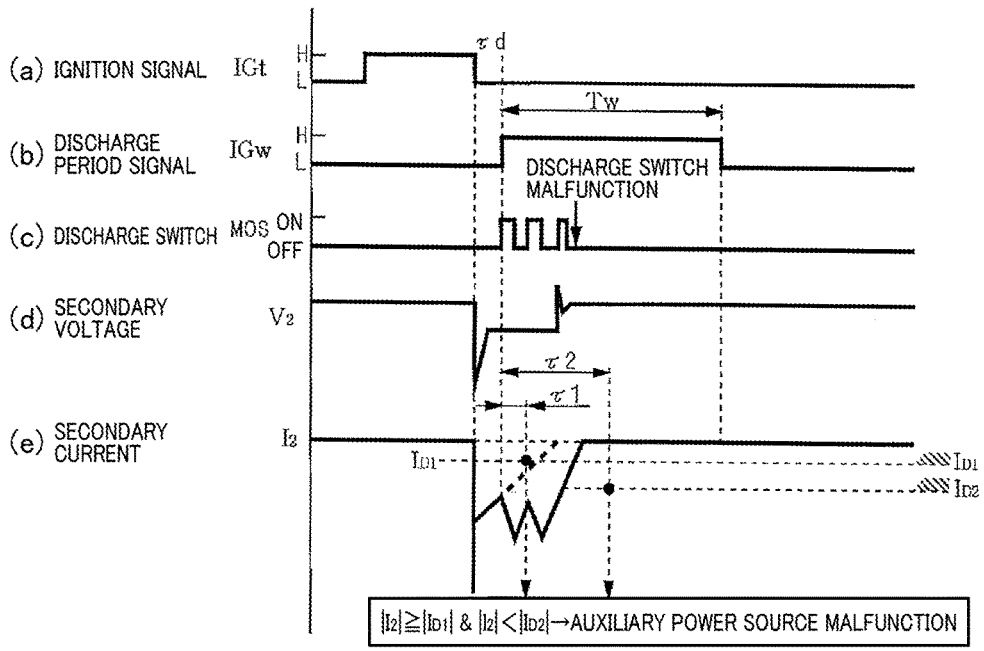
FIG. 16B is a timing diagram showing the effect of the malfunction determining means provided to the ignition device 7e of FIG. 14, and showing a case where malfunction of the auxiliary power source 5d is determined when the auxiliary power source 5d discharges.

FIG. 16B shows a case where the discharge switch 56 becomes inoperative because of overcurrent or the like. In this case, the discharge switch 56 does operate after ignition, but no longer comes to operate when the discharge driver 57d for driving the discharge switch 56 outputs the drive signal VG56. At the time when the second delay period $_T2$ elapses, because there is a flow of the discharge current due to only the normal spark discharge caused by applying the secondary voltage $V_2$ from the ignition coil unit 2, the secondary current $I_2$ is below the second delay period current threshold $I_{D2}$. Accordingly, since it is found that there is no discharge from the auxiliary power source 5, malfunction of the auxiliary power source 5 can be detected.

As shown in FIG. 16C, if the auxiliary power source 5d is normal and some malfunction has occurred in the ignition coil unit 2 or the ignition switch 4, the secondary current $I_2$ does not flow after closing and opening of the ignition signal IGt. Accordingly, because the secondary current $I_2$ is below the predetermined thresholds $I_{D1}$ and $I_{D2}$ at the time when the first or second delay period $_T1$ or $_T2$ elapses, occurrence of some malfunction can be detected in the ignition coil unit 2 or the ignition switch 4.

As shown in FIG. 16D, if both of the ignition coil unit 2 and the ignition switch 4 are normal under the condition where the auxiliary power source 5 is not used, the secondary current $I_2$ at the time when the third delay period $_T3$ elapses from the fall of the ignition signal IGt is equal to or larger than the predetermined threshold $I_{D3}$. Accordingly, the ignition coil unit 2 and the ignition switch 4 are detected to be normal.

As shown in FIG. 16E, if some malfunction has occurred in either of the ignition coil unit 2 and the ignition switch 4 under the condition where the auxiliary power source 5 is not used, the discharge current $I_2$ does not flow. Accordingly, the secondary current $I_2$ at the time when the third delay period $_T3$ elapses from the fall of the ignition signal IGt is equal to or below the predetermined threshold $I_{D3}$. Thus, occurrence of some malfunction can be detected in either of the ignition coil unit 2 and the ignition switch 4.

In the present embodiment, as shown in FIG. 17, the second delay period current threshold $I_{D2}$ at the time when the second delay period $_T2$ elapses is changed according to the secondary current target value $I_2I$. With this configuration, malfunction determination can be performed in conformity with a desired secondary current target value $I_2I$.

<Sixth Embodiment>

Figure 18A:
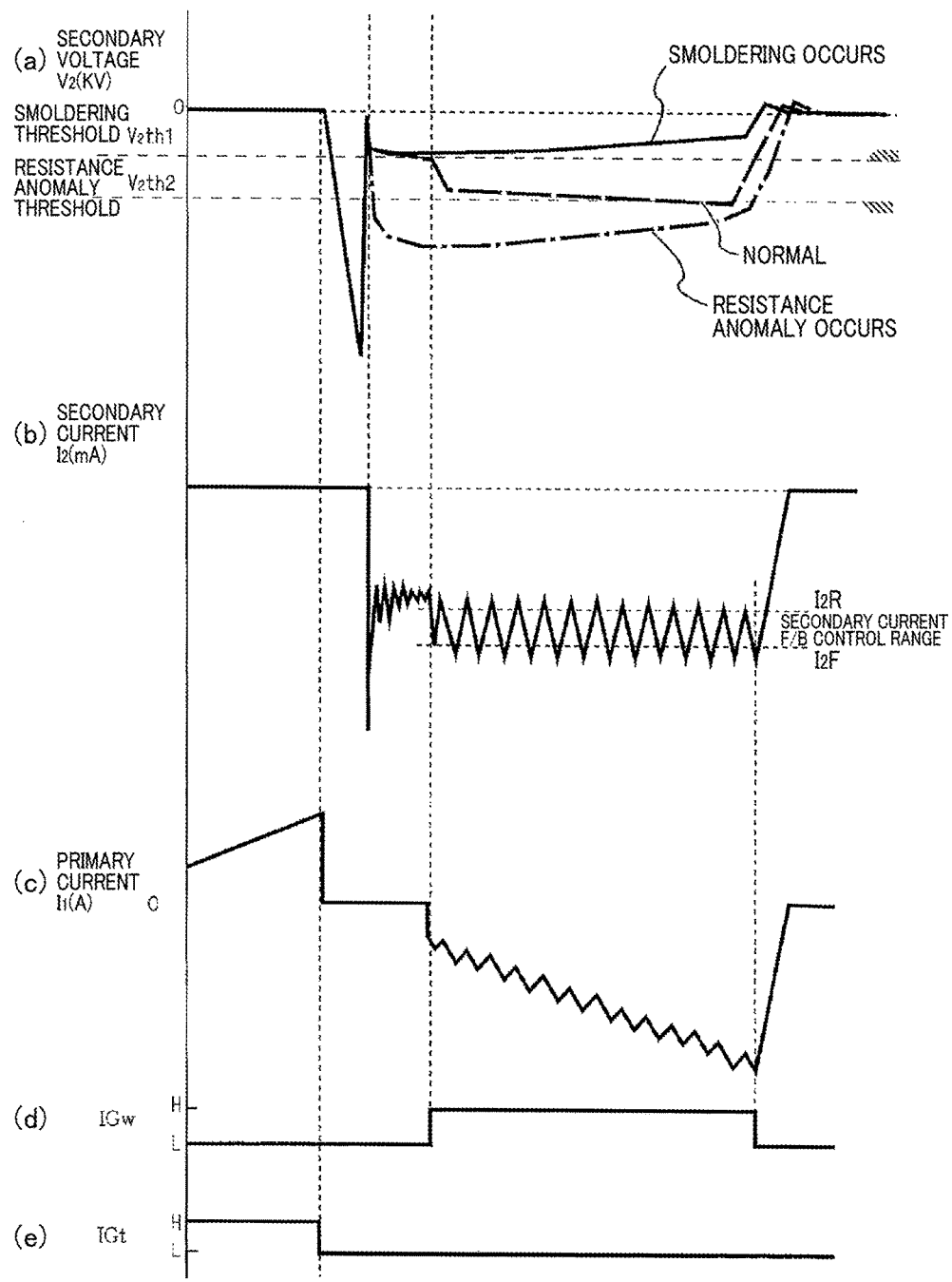
FIG. 18A is a timing diagram showing difference in change of secondary voltage between when smoldering malfunction occurs and when resistance anomaly occurs.
Figure 18B:
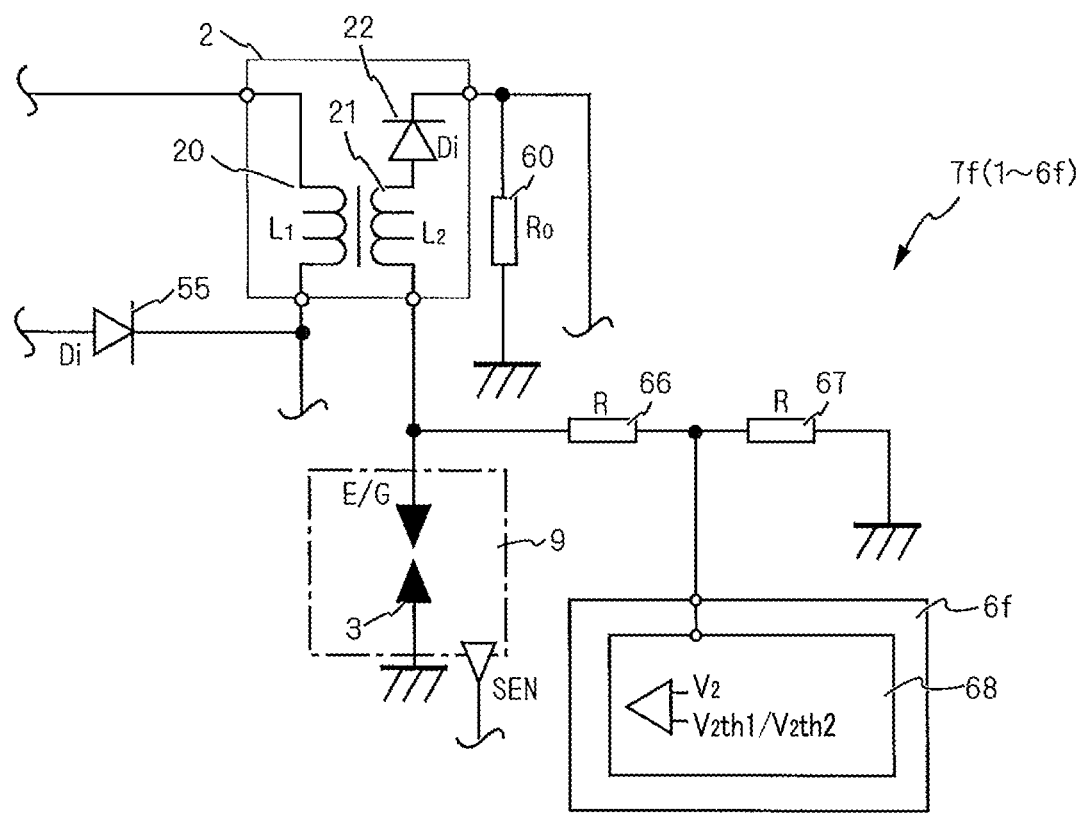
FIG. 18B is a configuration diagram showing a main portion of an ignition device 7f in a sixth embodiment of the present invention.
Figure 18C:
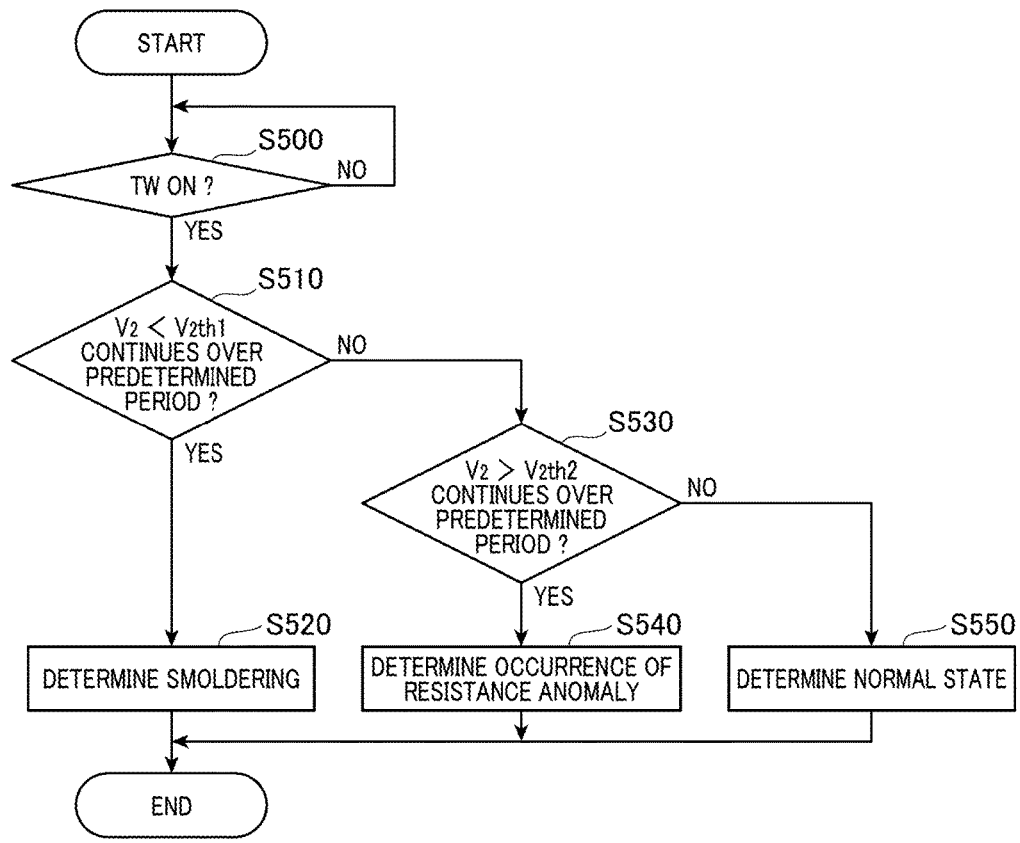
FIG. 18C is a flow diagram showing an example of plug malfunction determining method used in the ignition device 7f of FIG. 18B.

With reference to FIGS. 18A, 18B and 18C, next is described an ignition device 7f according to a sixth embodiment of the present invention. The ignition device 7f of the present embodiment includes the secondary current feedback controlling means (6 to 6e) similar to the above embodiments, and includes the malfunction determining means 62f which corresponds to the malfunction determining means 62e but further includes a secondary voltage detecting means (66, 67) detecting the secondary voltage $V_2$ and a secondary voltage determining means 68.

As shown in FIG. 18A, if smoldering occurs, the secondary voltage $V_2$ becomes low. If resistance anomaly occurs in a noise prevention resistor built in the ignition plug 3, the secondary voltage $V_2$ becomes high.

Accordingly, under the operating condition, such as during stop, idling or the like, where no strong in-cylinder airflow occurs in the combustion chamber and therefore blow-off is ensured not to occur, the malfunction determining means 62f judges the measured secondary voltage $V_2$ and the secondary current $I_2$ using thresholds. Thus, malfunction of the ignition plug 3, such as smoldering malfunction and resistance anomaly, can be detected.

In the present embodiment, the secondary voltage detecting means (66, 67) for detecting the secondary voltage $V_2$ is provided, and the malfunction determining means 62f compares the secondary voltage $V_2$ to a predetermined smoldering determination voltage threshold $V_2th1$ and a predetermined resistance anomaly determination voltage threshold $V_2th2$.

If the length of the period, where the detected secondary voltage $V_2$ is lower than the smoldering determination voltage threshold $V_2th1$, is longer than a predetermined length, it is determined smoldering has occurred.

If the length of the period, where the detected secondary voltage $V_2$ is higher than the resistance anomaly determination voltage threshold $V_2th2$, is longer than a predetermined length, it is determined the resistance anomaly has occurred.

If the length of the period, where the detected secondary voltage $V_2$ is lower than the smoldering determination voltage threshold $V_2th1$, is equal to or shorter than the predetermined length and the length of the period, where the detected secondary voltage $V_2$ is higher than the resistance anomaly determination voltage threshold $V_2th2$, is equal to or shorter than the predetermined length, normal operation is determined.

As shown in FIG. 18B, voltage dividing resistors 66 and 67 as the secondary voltage detecting means are provided between the secondary coil 21 of the ignition coil unit 2 and the ignition plug 8.

The secondary voltage $V_2$ proportionally divided by the voltage dividing resistors 66 and 67 is inputted to the secondary voltage determining means 68 provided to the feedback controlling means 6f of the present embodiment, and judged with the predetermined thresholds $V_2th1$ and $V_2th2$.

The malfunction determining means 62f can detect occurrence of the smoldering malfunction or the resistance anomaly.

With reference to FIG. 18C, hereinafter is described an example of a specific ignition plug malfunction determining method for determining malfunction of an ignition plug, which is based on the result of judgement with thresholds performed by the secondary voltage determining means 68.

In discharge period determining step S500, it is determined whether the discharge period signal IGw is ON or not. If it is during the discharge period, the judgement is Yes, and the flow proceeds to step S510.

If it is not during the discharge period, the judgement is No, and the loop of step S510 is repeated until the discharge period.

In smoldering determining step S510, the secondary voltage $V_2$ detected by the secondary voltage detecting means 66, 67 is compared with the smoldering determination voltage threshold $V_2th1$. It is determined whether smoldering malfunction (low plug resistance) has occurred or not by determining whether the period, during which the discharge voltage $V_2$ is determined to be smaller than the predetermined smoldering determination voltage threshold $V_2th1$, has continued for a predetermined period or more.

If the period, during which the discharge voltage $V_2$ is determined to be smaller than a predetermined smoldering determination voltage threshold $V_2th1$, has continued for a predetermined period or more, the judgement is Yes, and the flow proceeds to step S520.

In smoldering determining step S520, because the period, during which the discharge voltage $V_2$ is determined to be smaller than the predetermined threshold, has continued for a predetermined period or more, it is determined smoldering has occurred.

In step S510, if the discharge voltage $V_2$ rises in a predetermined period and exceeds the predetermined smoldering determination voltage threshold $V_2th1$, the judgement is No, and the flow proceeds to step S530.

In resistance anomaly determining step S530, it is determined whether the period, during which the discharge voltage $V_2$ is determined to be higher than the predetermined resistance anomaly determination voltage threshold $V_2th2$, has continued for a predetermined period or more.

If it is determined that the period, during which the discharge voltage $V_2$ is determined to be higher than the resistance anomaly determination voltage threshold $V_2th2$, has continued for a predetermined period or more, the judgement is Yes, and the flow proceeds to step S540.

In resistance anomaly determining step S540, because the period, during which the discharge voltage $V_2$ is higher than the predetermined resistance anomaly determination voltage threshold $V_2th2$, has continued for the predetermined length or more, built-in resistor anomaly is determined.

In step S510, if the discharge voltage $V_2$ lowers within a predetermined period and becomes lower than the predetermined resistance anomaly determination voltage threshold $V_2th2$, the judgement is No, and the flow proceeds to S550.

In normality determining step S550, because the discharge voltage $V_2$ exceeds the smoldering determination voltage threshold $V_2th1$ within a predetermined period and falls below the predetermined resistance anomaly determination voltage threshold $V_2th2$ within the predetermined period, normality is determined.

If any one of the determinations is made, the plug malfunction determining step is terminated.

The plug malfunction determination (S500 to S550) is performed during stable traveling, idling or the like.

REFERENCE SIGNS LIST

1 Direct-current power source
2 Ignition coil unit
20 Primary coil
21 Secondary coil
22 Rectifier device
3 Ignition plug
4 Ignition switch
5 Auxiliary power source
54 Discharge energy accumulating means (capacitor for discharge)
56 Discharge switch (semiconductor switching element for discharge)
57 Discharge driver
6 Feedback controlling means
60 Secondary current detector resistor
61 Secondary current feedback controlling circuit
62 Malfunction determining means (discharge blow-off detecting means)

63 Secondary current command value calculating means
64 Secondary current learning means
7 Ignition device
IGt Ignition signal
IGw Discharge period signal
$IG_F$ Discharge blow-off signal
IGA Secondary current changeover signal
$I_2$ Secondary current
$I_2I$ Secondary current target value
$I_2L$ Secondary current correction learning value
$I_2LL$ Blow-off detection threshold
$I_{THR}$ Upper limit current
$I_{THF}$ Lower limit current
Ith Blow-off limiting threshold
$V_2$ Secondary voltage
$V_{12}$ Secondary current detection voltage
$V_{THR}$ Upper limit voltage
$V_{THF}$ Lower limit voltage
$S_{FB}$ Feedback signal
$P_{FB}$ Feedback drive signal
$_Td$ Delay period
$_T1$ First delay period
$_T2$ Second delay period
$_T3$ Third delay period
$I_{D1}$ First delay period current threshold
$I_{D2}$ Second delay period current threshold
$I_{D3}$ Third delay period current threshold

What is claimed is:

1. An ignition device, comprising:
a direct-current power source;
an ignition coil unit including a primary coil and secondary coil, an electric current through the primary coil being increased and decreased by interrupting the electric current from the direct-power source, thereby generating a high voltage in the secondary coil;
an ignition switch switching between supply of and interrupt of the electric current to the primary coil according to an ignition signal, the ignition signal being sent according to an operating condition;
an ignition plug connected to the secondary plug and generating electric sparks due to spark discharge caused by the high voltage applied from the secondary coil; and
an auxiliary power source superimposing electric energy on a downstream side of the primary coil after start of the spark discharge from the ignition plug,
the auxiliary power source including a discharge energy accumulating means, a discharge switch, a discharge driver turning and a secondary current feedback controlling means,
the discharge energy accumulating means being for accumulating electric energy from the direct-current power source,
the discharge switch switching between allowing discharge and stopping discharge from the discharge accumulating means,
the discharge driver turning the discharge switch,
the secondary current feedback controlling means including a secondary current detecting means and a secondary current feedback controlling circuit, the secondary current detecting means being for detecting the secondary current flowing through the secondary coil during the discharge period from the ignition coil unit, the secondary current feedback controlling circuit turning the discharge switch on the basis of the secondary current detected by the secondary current detecting means,
the ignition device allowing the auxiliary power source to input energy without reversing the polarity of the secondary current.

2. The ignition device according to claim 1, wherein
the secondary current feedback controlling means includes a secondary current feedback controlling circuit judging an upper limit and a lower limit of a secondary current on the basis of two thresholds, the secondary current being detected by the secondary current detecting means, and turning the discharge switch on the basis of the judgement result.

3. The ignition device according to claim 2, wherein
the secondary current detecting means outputs a secondary current detection voltage which is the secondary current converted into voltage, and
the secondary current feedback controlling circuit includes a comparator and judges the secondary current detection voltage with a predetermined upper limit voltage or a predetermined lower limit voltage by means of the comparator, the comparator comparing the secondary current detection voltage with the upper limit voltage when the secondary current is rising, and with the lower limit voltage when the secondary current is falling.

4. The ignition device according to claim 1 wherein the secondary current feedback controlling means detects occurrence of discharge blow-off on the basis of the secondary current, aside from the secondary current feedback controlling circuit.

5. The ignition device according to claim 4, wherein the secondary current feedback controlling means includes the secondary current feedback controlling circuit, a secondary current command value calculating means for calculating a secondary current target value as a target, according to operating condition of an internal combustion engine, and a secondary current learning means for correcting the secondary current target value as a target, depending on whether the discharge blow-off has occurred.

6. The ignition device according to claim 5, comprising a discharge blow-off detecting means for detecting whether discharge blow-off has occurred, and sending a discharge blow-off signal.

7. The ignition device according to claim 6, wherein:
the secondary current command value calculating means sets a predetermined secondary current basis command value according to operating condition of an internal combustion engine, and sets an initial value of a secondary current correction learning value;
the secondary current learning means determines whether blow-off has occurred by comparing the secondary current with a blow-off current threshold, increases the correction learning value when it is determined that blow-off has occurred, and decreases the correction learning value when it is determined that combustion state is stable without occurrence of blow-off; and
the secondary current command value calculating means inputs a sum of the basis command value and the correction learning value, as a new secondary current command value, to the secondary current feedback controlling circuit to perform feedback control wherein the secondary current command value is used as a secondary current target value.

8. The ignition device according to claim 6, wherein the discharge blow-off detecting means includes a malfunction determining means for determining malfunction which has occurred in any one of the ignition coil unit, the ignition switch and the auxiliary power source by comparing a first secondary current and a second secondary current with a first delay time current threshold and a second delay time current threshold, respectively, the first secondary current being the secondary current at the time when a predetermined first delay time elapses from the falling edge of the ignition signal, the second secondary current being the secondary current at the time when a predetermined second delay time elapses from the falling edge of the ignition signal.

9. The ignition device according to claim 8, wherein the malfunction determining means at least comprises steps of:
determining that the ignition coil unit, the ignition switch and the auxiliary power source re normal, if the secondary current is the first delay time current threshold or more and the second delay time current threshold or more;
determining that the auxiliary power source has some malfunction, if the secondary current is the first delay time current threshold or more and below the second delay time current threshold; and
determining that the ignition coil unit or the ignition switch has some malfunction, if the secondary current is below the first delay time current threshold.

10. The ignition device according to claim 8, wherein:
the discharge blow-off detecting means includes an auxiliary energy necessity determining means for determining necessity of input of energy from the auxiliary power source; and
if the auxiliary energy necessity determining means has determined input of energy from the auxiliary power source is unnecessary, the discharge blow-off detecting means determines that malfunction has occurred in either the ignition coil unit or the ignition switch by comparing a third secondary current with a third delay time current threshold, the third secondary current being the secondary current at the time when a predetermined third delay time elapses from the falling edge of the ignition signal.

11. The ignition device according to claim 8, comprising a secondary voltage detecting means for detecting a secondary voltage,
the malfunction determining means compares the secondary voltage with a predetermined smoldering determination voltage threshold and a predetermined resistance anomaly voltage threshold, determines occurrence of smoldering if a period during which the secondary voltage is below the smoldering determination voltage threshold is longer than a predetermined period, determines occurrence of resistance anomaly if a period during which the secondary voltage is larger than the resistance anomaly voltage threshold is longer than a predetermined period, and determines the device to be normal if a period during which the secondary voltage is smaller than the smoldering determination voltage threshold is within a predetermined period, and a period during which the secondary voltage is larger than the resistance anomaly voltage threshold is within a predetermined period.

* * * * *